US012644436B2

(12) United States Patent
Bahnij

(10) Patent No.: US 12,644,436 B2
(45) Date of Patent: *Jun. 2, 2026

(54) METHOD AND APPARATUS FOR DECOMMISSIONING WIND TURBINE BLADES

(71) Applicant: Praetorian Renewables, LLC, Cleveland, OH (US)

(72) Inventor: Matthew Bahnij, Westlake, OH (US)

(73) Assignee: Praetorian Renewables, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/259,488

(22) Filed: Jul. 3, 2025

(65) Prior Publication Data

US 2025/0334102 A1 Oct. 30, 2025

Related U.S. Application Data

(63) Continuation of application No. 18/897,525, filed on Sep. 26, 2024, now Pat. No. 12,372,064.

(60) Provisional application No. 63/585,253, filed on Sep. 26, 2023.

(51) Int. Cl.
*F03D 80/00* (2016.01)

(52) U.S. Cl.
CPC ........ *F03D 80/011* (2023.08); *F05B 2230/70* (2013.01); *F05B 2250/12* (2013.01); *F05B 2260/02* (2013.01)

(58) Field of Classification Search
CPC ............................ F03D 80/00; F05B 2230/70
See application file for complete search history.

(56) References Cited

U.S. PATENT DOCUMENTS

| | | | |
|---|---|---|---|
| 2017/0362406 A1* | 12/2017 | Li | C08J 5/043 |
| 2019/0066062 A1* | 2/2019 | Lilly | B29B 17/0412 |
| 2020/0061725 A1* | 2/2020 | Lilly | B23D 57/0053 |
| 2020/0340445 A1* | 10/2020 | Denson | B23D 47/12 |
| 2022/0161461 A1* | 5/2022 | Gaspard, II | B29B 17/04 |
| 2023/0057162 A1* | 2/2023 | Li | C04B 20/0048 |
| 2023/0078101 A1* | 3/2023 | Jensen | B23D 57/0092 |
| | | | 83/13 |
| 2023/0136172 A1* | 5/2023 | Korsgaard | B02C 18/0084 |
| | | | 241/25 |
| 2023/0211391 A1* | 7/2023 | Kendall | B09B 3/35 |
| | | | 241/18 |
| 2025/0290490 A1* | 9/2025 | Jayakumar | F03D 80/011 |

* cited by examiner

*Primary Examiner* — Kyle A Cook
(74) *Attorney, Agent, or Firm* — Benesch Friedlander Coplan & Aronoff LLP

(57) ABSTRACT

A method for decommissioning a wind turbine blade includes separating a root section of a turbine blade from a tip section of a turbine blade, and laterally cutting the tip section of the turbine blade into a plurality of separate tip subsections. Each tip subsection is cut along its length, flattened, deposited into a compacting and bundling apparatus, and compressed. The compressed tip subsections are bundled in the compacting and bundling apparatus with banding material to form a bundle. The bundle is removed from the compacting and bunding apparatus and loaded onto a transportation vehicle.

12 Claims, 20 Drawing Sheets

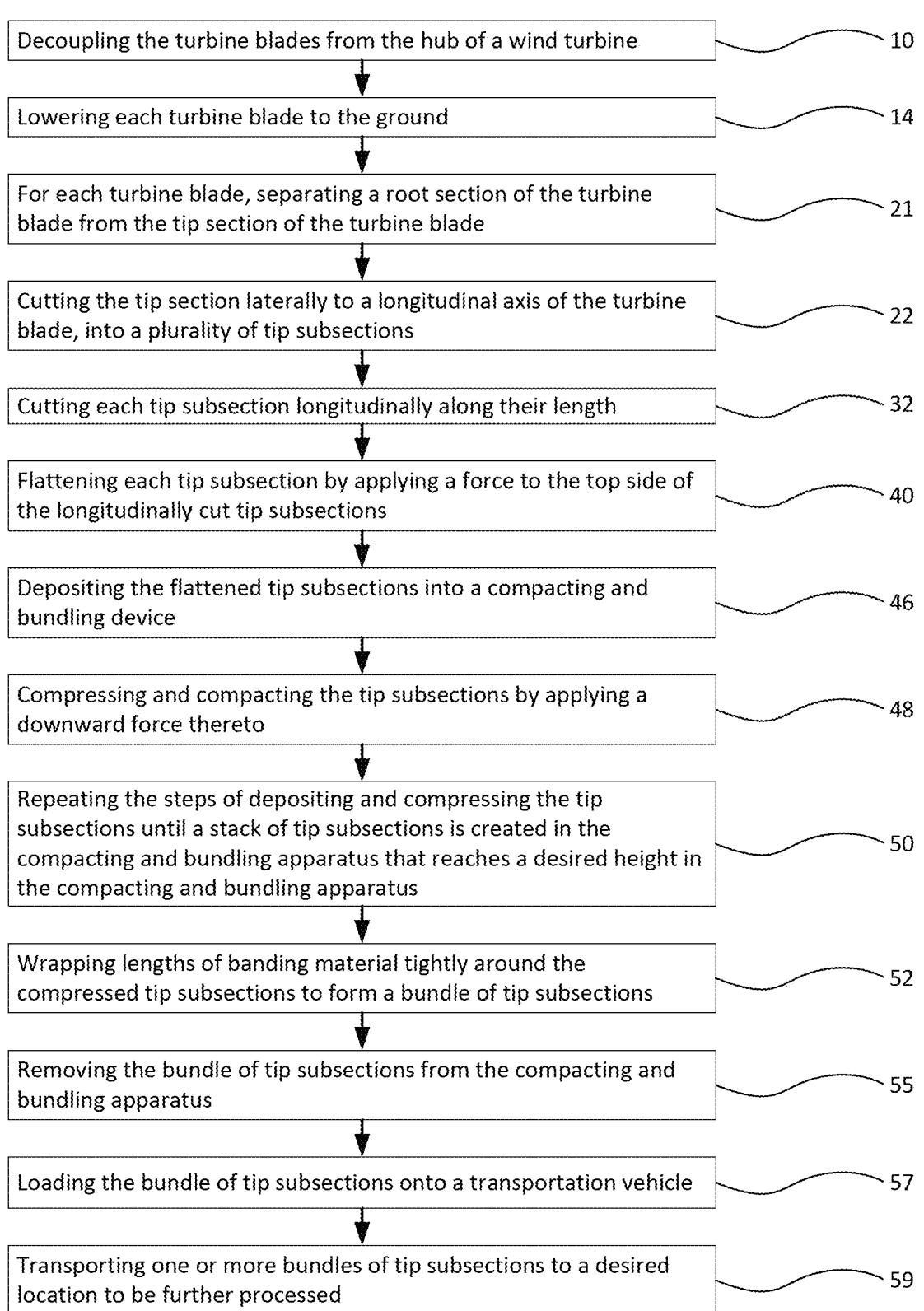

Decoupling the turbine blades from the hub of a wind turbine — 10

Lowering each turbine blade to the ground — 14

For each turbine blade, separating a root section of the turbine blade from the tip section of the turbine blade — 21

Cutting the tip section laterally to a longitudinal axis of the turbine blade, into a plurality of tip subsections — 22

Cutting each tip subsection longitudinally along their length — 32

Flattening each tip subsection by applying a force to the top side of the longitudinally cut tip subsections — 40

Depositing the flattened tip subsections into a compacting and bundling device — 46

Compressing and compacting the tip subsections by applying a downward force thereto — 48

Repeating the steps of depositing and compressing the tip subsections until a stack of tip subsections is created in the compacting and bundling apparatus that reaches a desired height in the compacting and bundling apparatus — 50

Wrapping lengths of banding material tightly around the compressed tip subsections to form a bundle of tip subsections — 52

Removing the bundle of tip subsections from the compacting and bundling apparatus — 55

Loading the bundle of tip subsections onto a transportation vehicle — 57

Transporting one or more bundles of tip subsections to a desired location to be further processed — 59

FIG. 20

METHOD AND APPARATUS FOR DECOMMISSIONING WIND TURBINE BLADES

CROSS-REFERENCE TO RELATED APPLICATIONS

This application is a continuation of U.S. application Ser. No. 18/897,525, filed Sep. 26, 2024, which claims priority to U.S. Provisional Application Ser. No. 63/585,253, filed Sep. 26, 2023, the entire contents of which is hereby incorporated by reference herein.

FIELD

The present disclosure generally relates to methods and systems for efficiently decommissioning a wind turbine. More specifically, the present disclosure relates to methods and apparatus for systematically cutting turbine blades into sections, compressing the sections into manageable bundles, banding the bundles, and loading such banded bundles onto flatbed trucks for transport to a desired destination.

BACKGROUND

Over the past few decades, large scale wind turbines have become an increasingly significant source of energy production throughout the world. With legislative, environmental, and consumer pressures favoring renewable energy sources, the number of wind turbines generating electricity should continue to grow in the United States and throughout the world. In 2022, wind turbines operated in all fifty U.S. states, and such turbines produced 435 terawatt hours, accounting for more than ten percent of the electrical energy produced in the United States.

The first large scale wind farms in the United States were built in the late 1970's. Due to wear and tear and advancing technology, the average large scale wind turbine has a service life of approximately 15 to 20 years. Therefore, the market in the United States is well into its third generation of upgrading wind turbines. Typically, when a wind turbine is upgraded, the turbine blades are replaced with new blades. If the new turbine blades are significantly larger than the existing blades, a new generator may be added to accommodate the larger blades. Because of the relatively short service life of a wind turbine and the increasing dependence on wind generated electrical energy, replacing and upgrading existing wind turbine blades, specifically the blades of wind turbines, with newer technology is an important economic factor in the wind power industry.

As with any other industry, the economic efficiency of producing its product (i.e., electricity through wind power) is a critical factor in making the wind turbine industry profitable. However, the cost of decommissioning a large scale wind turbine that has reached the end of its service life can dramatically increase costs for the industry. Due to the size of the industrial-scale turbine blades, which range from 100 feet to more than 300 feet in length, the removal and disposal of such industrial-scale blades is a resource consuming process. The current process for decommissioning a wind turbine includes disconnecting each blade from its tower, loading the blade on a flatbed truck, and transporting that blade to a recycling or landfill facility. The size of each industrial-scale blade often requires a dedicated flatbed truck to transport each turbine blade. And due to the broad geographic distribution of wind turbines and the sparce locations of recycling facilities and appropriate landfills, the distance the blade is transported may be several hundred or even thousands of miles. It will be readily appreciated that such a removal and disposal process is expensive due to the number of flatbed trucks and personnel required. In addition to the raw number of flatbed trucks and drivers required, it is often a logistical hurdle to procure the requisite number of flatbed trucks and drivers needed to decommission a large industrial-scale wind turbine farm.

The wind turbine industry needs methods for efficiently decommissioning and transporting existing turbine blades to a final distant destination that use fewer physical resources and labor. Disclosed herein are novel methods and apparatus for cutting and efficiently bundling turbine blades so that up to three industrial-scale turbine blades can be loaded onto a single flatbed truck. Such methods make use of a novel apparatus useful in compacting and bundling wind turbine blades and result in a significant reduction in the number of transport vehicles and drivers required.

SUMMARY

Disclosed herein are methods and an apparatus for decommissioning industrial-scale wind turbine blades. One exemplary method includes the steps of: separating a root section from a tip section of a turbine blade; forming horizontal cuts, or cuts that are perpendicular to a longitudinal axis of the turbine blade, in the tip section to form multiple tip subsections; making one or more longitudinal cuts in each tip subsection; applying a force on the topside of each tip subsection to flatten the tip subsection; depositing the flattened tip subsections into a compacting and bundling apparatus, frame, or fixture; further compressing the tip subsections in the compacting and bundling apparatus; applying lengths of banding material around a plurality of stacked and compacted/compressed tip subsections to form a bundle of tip subsections; removing the bundle from the compacting and bunding apparatus; and depositing the bundle onto a transportation vehicle.

One exemplary compacting and bundling apparatus includes a base formed by four base members, four posts secured to and rising vertically from the base, and two cross members extending horizontally from one portion of the base to the opposite portion on the base. The overall dimensions of the compacting and bundling apparatus in this example are 12 feet in height, 15 feet in length, and 8 feet in width.

BRIEF DESCRIPTION OF DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings are schematic in nature and many of the drawings are not to scale. The proportion of certain elements may be exaggerated for the purpose of illustration. The present invention is described in detail below with reference to the attached drawing figures, wherein:

FIG. 20 is flow chart depicting an embodiment of a method of decommissioning a wind turbine, or wind turbine blades, of the present disclosure.

DETAILED DESCRIPTION

Figure 1:
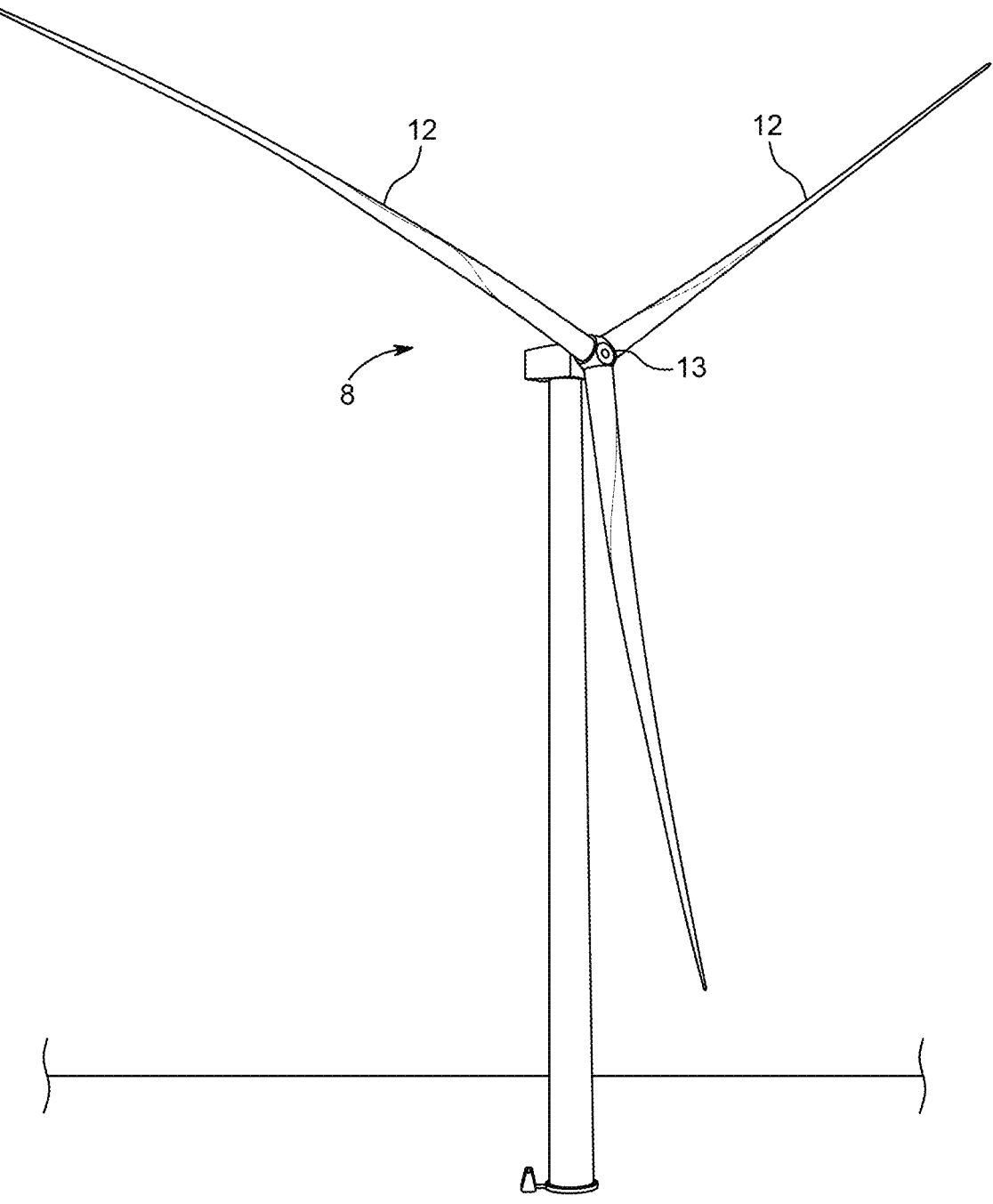
FIG. 1 is a schematic perspective view of an embodiment of a fully assembled wind turbine of the present disclosure.

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of methods and apparatus for decommissioning large scale wind turbines and wind turbine blades are hereinafter disclosed and described in detail with reference made to FIGS. 1 through 20.

Disclosed herein is a method and apparatus useful in efficiently cutting, compressing, bundling, and transporting decommissioned industrial-scale wind turbine blades. The description of the method disclosed herein addresses the decommissioning of turbine blades that are approximately 162 feet in length and weigh approximately 23,000 lbs. each. However, the principles of the method disclosed are equally applicable to other size turbine blades, without departing from the scope of the present disclosure. Furthermore, in one embodiment of the method disclosed herein, the transportation of the bundled turbine blades is performed by flatbed trucks, or trucks coupled to a flatbed trailer, which flatbed trailers range in size from approximately 48 to 53 feet in bed length. As with the length of the turbine blades, the principle of the method disclosed is equally applicable to other size transportation flatbed trucks without departing from the scope of the present disclosure. A benefit of the method is that resulting bundles of cut and compressed turbine blades can be efficiently loaded onto flatbed trucks with up to three turbine blades fitting onto a single flatbed truck. Such an arrangement is significantly more efficient than the current method of loading a single blade onto each flatbed truck. It will readily be appreciated that the novel method disclosed herein results in increased hauling/transporting efficiency, a decrease in the volume of space necessary on a flatbed truck to transport a single decommissioned turbine blade, an increase in the total amount and mass of turbine blade material that can be carried by a single flatbed truck, an increase in the number of turbine blades that accordingly can be transported by a single flatbed truck, and a significant reduction in the resources (both flatbed trucks and drivers) required to decommission industrial-scale turbine blades and transport such blades to a final destination. Such reductions in resources can require only a third of the number of flatbed trucks and personnel needed to accomplish decommissioning and transportation, as compared to prior art methods. Additional savings is realized due to reduced fuel usage, maintenance costs, and insurance payments. Additionally, the compact arrangement of the bundles of cut and compressed turbine blades makes the bundles significantly easier to manage in both loading and unloading the flatbed truck.

Figure 2:
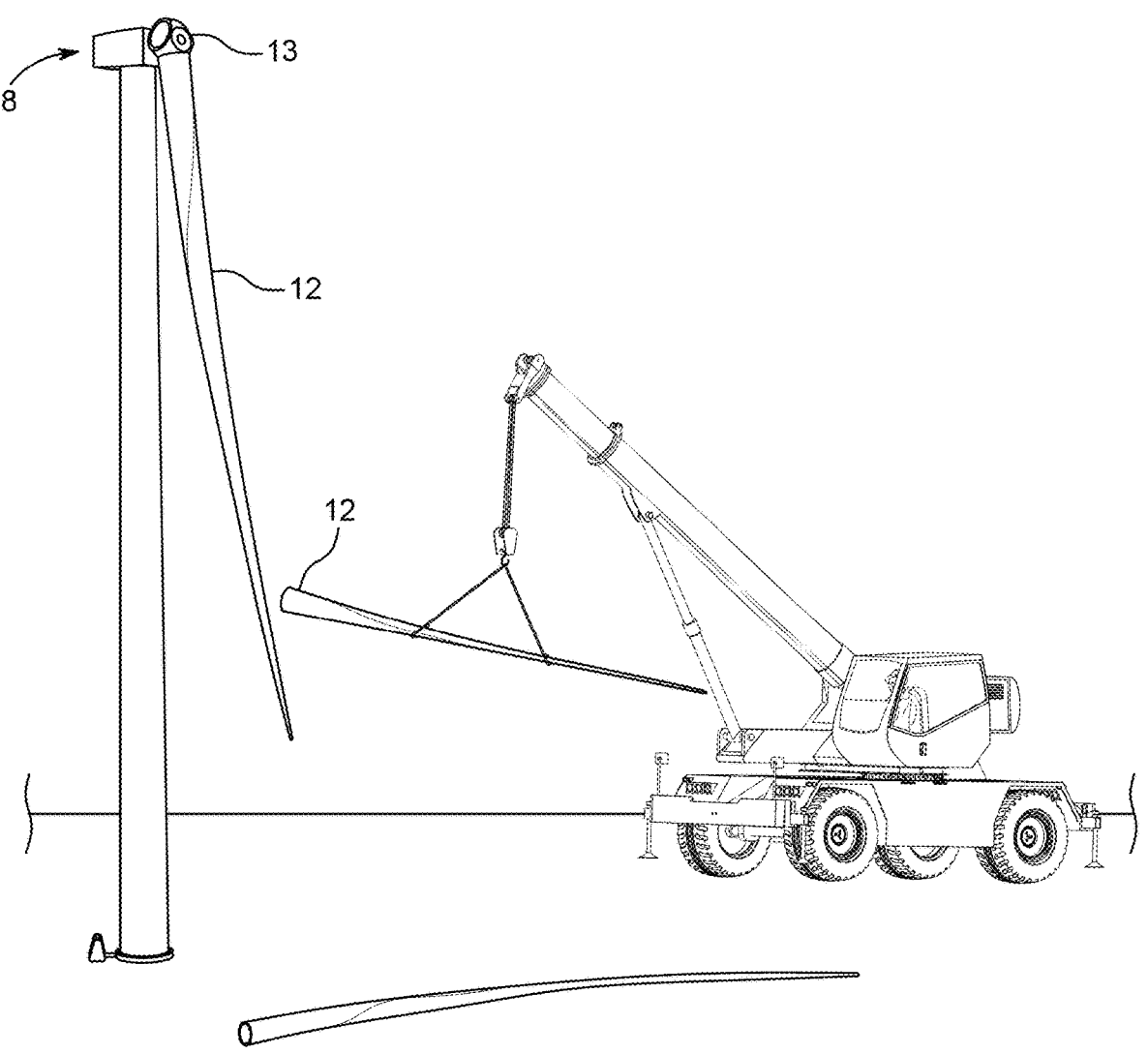
FIG. 2 is a schematic perspective view of an embodiment of a wind turbine having the turbine blades removed for decommissioning.
Figure 3:
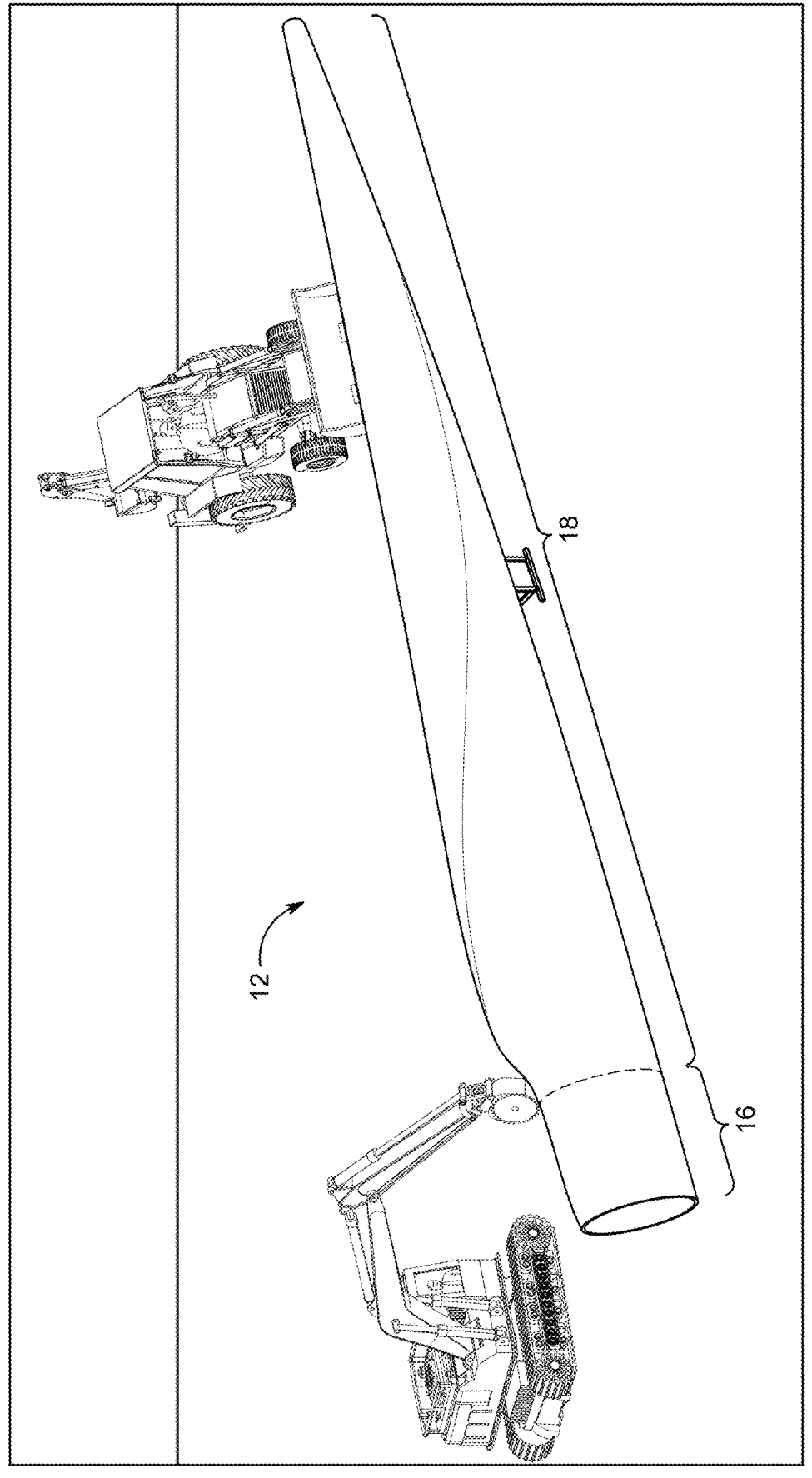
FIG. 3 is a schematic perspective view of an embodiment of a turbine blade being laterally cut to separate the root section of a turbine blade from the tip section of the turbine blade.

Referring to FIG. 1, a complete wind turbine 8, ready for decommissioning, is shown with three turbine blades 12 coupled to a central hub 13 of the turbine's generator. Referring to FIG. 2, the method begins by workers decoupling 10 each turbine blade 12 from its tower and lowering 14 the blade to the ground. Referring to FIGS. 2 and 3, a turbine blade 12 includes a root section 16 and a tip section 18. The root section 16 is the first short section of the turbine blade 12 that is used to attach the turbine blade 12 to the central hub 13 and/or generator of the turbine, and is typically constructed from steel and fiberglass. The tip section 18 is typically constructed of fiberglass and extends longitudinally from the root 16 to form the bulk of the turbine blade 12.

Referring further to FIG. 3, once on the ground, the root section 16 of the turbine blade 12 is separated 21 from the tip section 18, for example by through cutting the wind turbine blade substantially laterally 22, or perpendicularly to a longitudinal axis of the turbine blade 12, at a location along the longitudinal length of the turbine blade where the root section 16 ends and the tip section 18 begins. The root section 16 can be loaded onto a transportation vehicle and transported to its final destination for recycling or further processing once detached from the remainder of the turbine blade 12.

Figure 4:
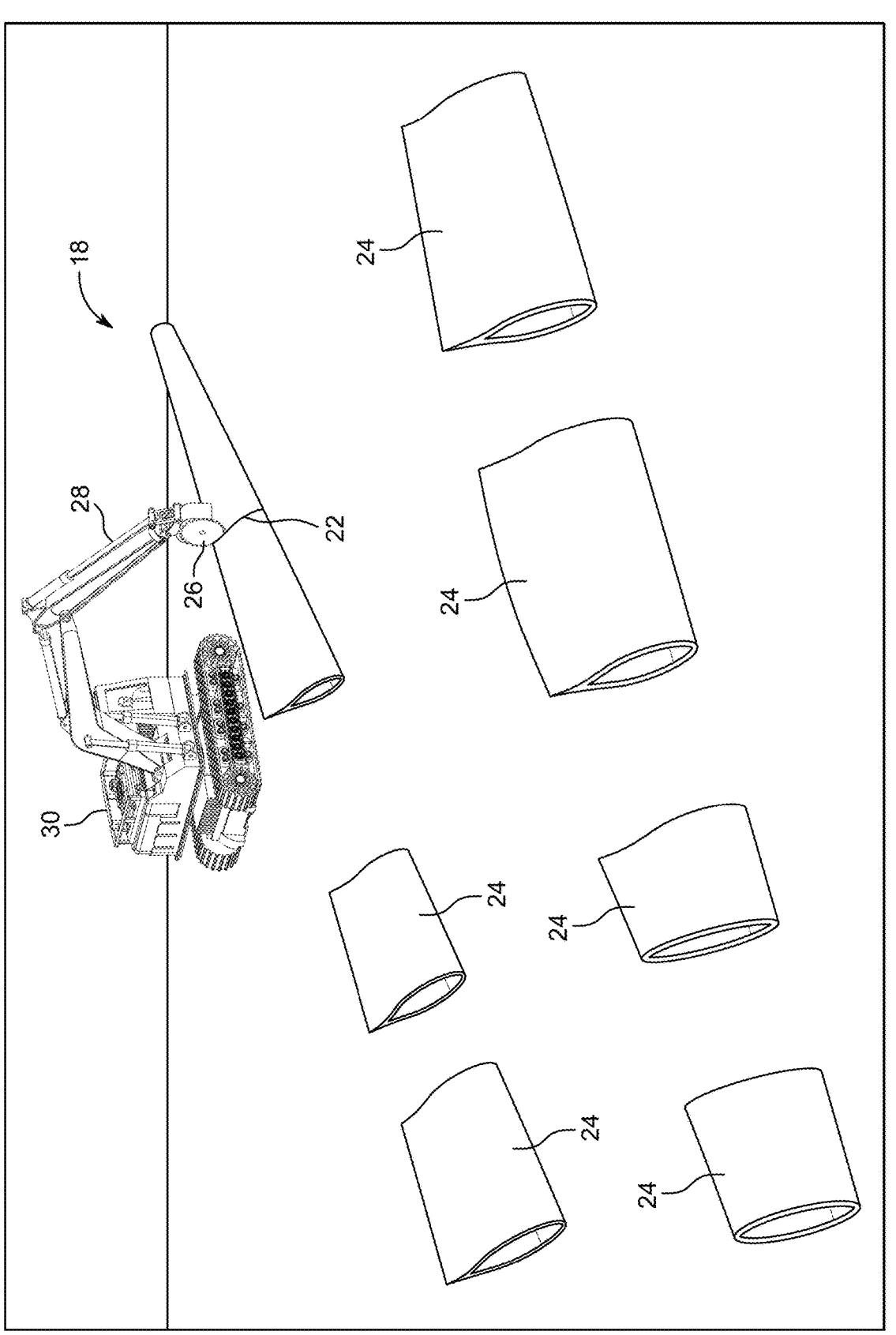
FIG. 4 is a schematic perspective view of an embodiment of an excavator equipped with a circular saw blade cutting the tip section of the turbine blade into a series of tip subsections.

Referring to FIG. 4, the tip section 18 is broken down into smaller sections by cutting the tip section 18 substantially laterally 22, or perpendicularly to the longitudinal axis of the turbine blade 12, into tip subsections 24 that are, for example in one embodiment, between 15 to 20 feet long. In one embodiment, for a 162 foot long turbine blade 12, for example, this operation would result in cutting the tip section 18 into about 8 to 10 tip subsections 24. The cutting operations are typically performed by a rotating blade or circular saw 26 attached to the arm 28 of a heavy equipment vehicle 30 such as, for example, an excavator. However, in alternate embodiments, additional or alternate cutting equipment can be used to cut either the root section from the tip section, or the tip section into tip subsections 24, without departing from the scope of the present disclosure.

Figure 5:
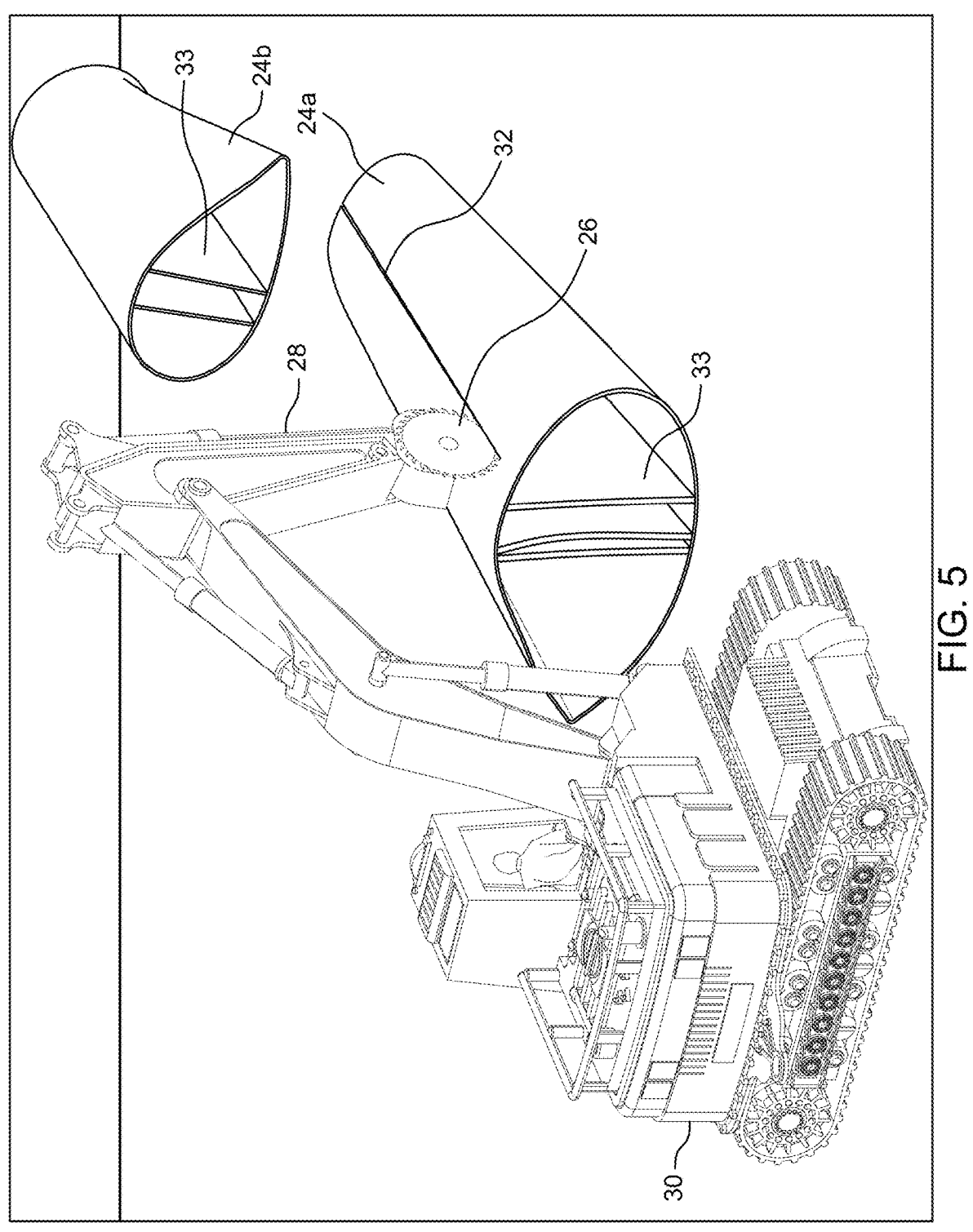
FIG. 5 is a schematic perspective view of an embodiment of an excavator equipped with a circular saw blade making a longitudinal cut through a tip subsection of a turbine blade.
Figure 6:
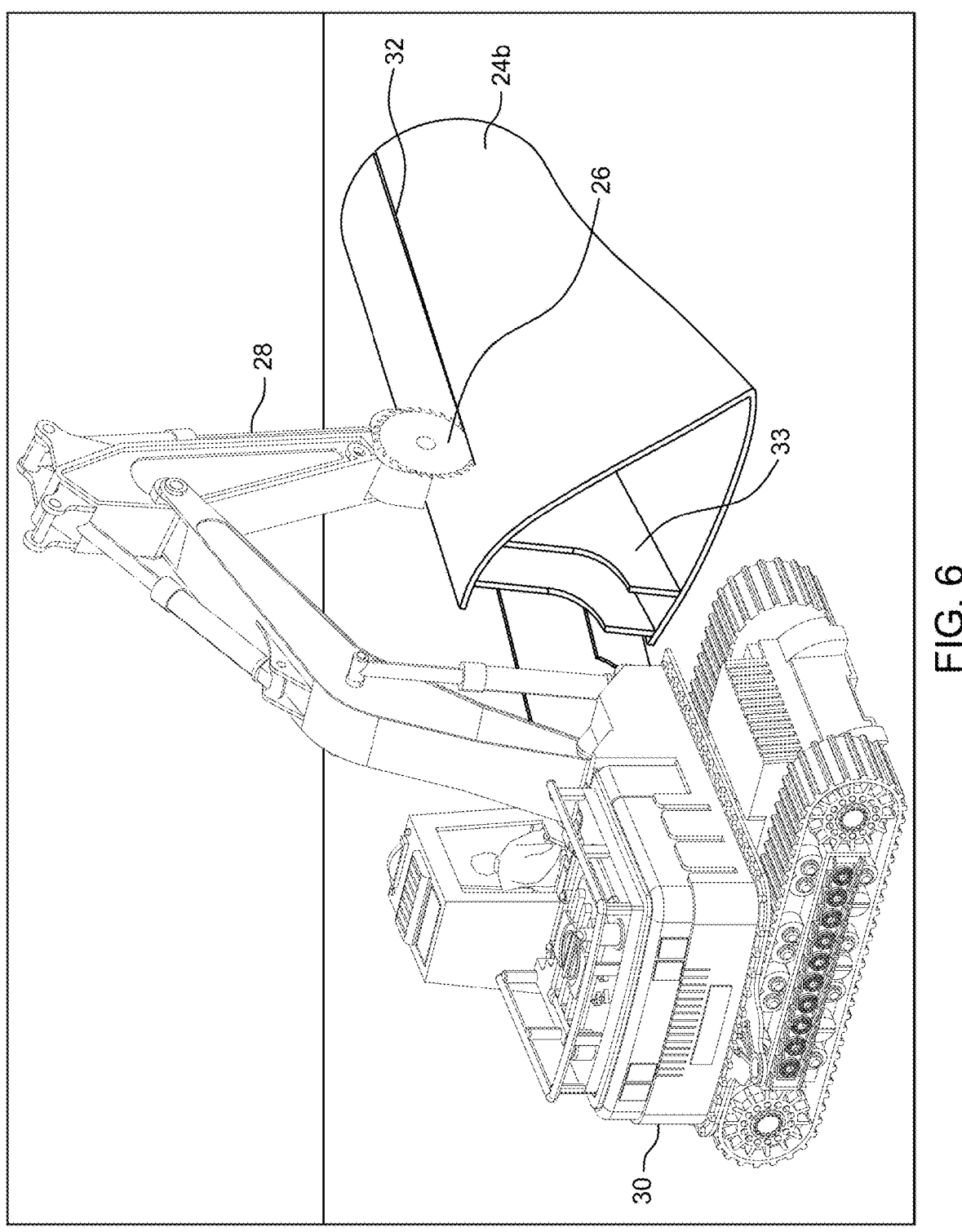
FIG. 6 is a schematic perspective view of an embodiment of an excavator equipped with a circular saw blade making another longitudinal cut through another tip subsection of the turbine blade.
Figure 7:
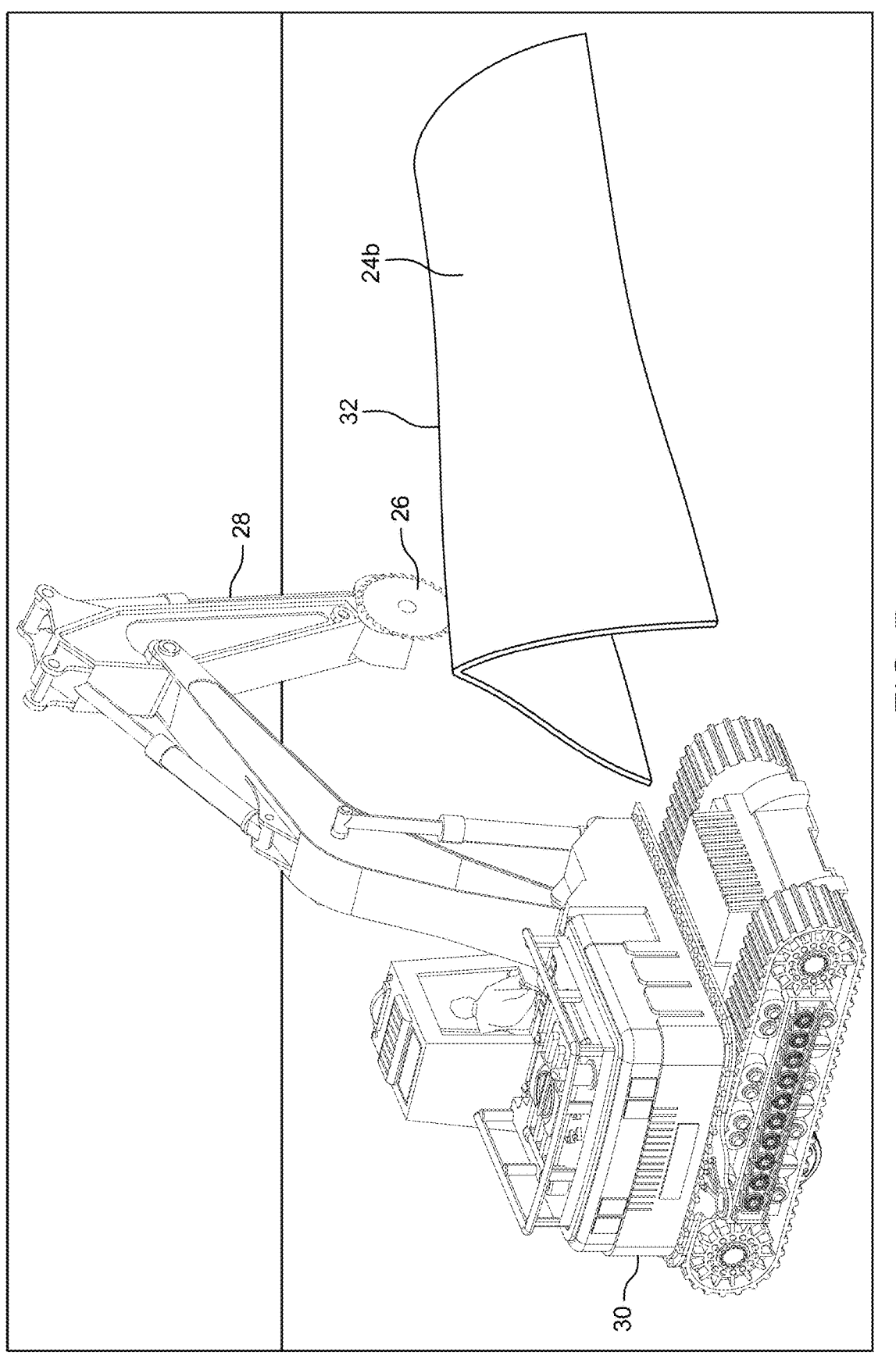
FIG. 7 is a schematic perspective view of an embodiment of an excavator equipped with a circular saw blade making additional longitudinal cuts through the tip subsection of a turbine blade from FIG. 6, to further break down the tip subsection.

Referring to FIGS. 5-7, after cutting the tip section 18 laterally into multiple tip subsections 24 (e.g. 15 to 20 foot long tip subsections 24, for example), the method continues by next cutting 32, with the circular saw 26, each of the tip subsections 24 longitudinally along their length, or generally parallel to the longitudinal axis of the turbine blade 12, at one or more locations around each tip subsection, in order to make the tip subsections more compactable, maneuverable, and/or manageable, and overall easier to move and handle. FIG. 5 depicts two of the tip subsections 24a and 24b, with tip subsection 24a being cut longitudinally along its length, with tip subsection 24b waiting to be cut next. FIG. 6 depicts tip subsection 24b being cut longitudinally so that it can be further broken down to occupy less physical space/volume. FIG. 7 depicts tip subsection 24b being further cut longitudinally at another location to further break down tip subsection 24b into smaller and less space/volume consuming pieces. The location of each longitudinal cut 32 on each such tip subsection 24 is strategically chosen for each tip subsection to make it easier to break down, or collapse/flatten, each tip subsection 24 into even flatter or smaller pieces, so as to reduce or eliminate as much of the empty volume/space present within the interior of each tip subsection 24 as possible. For example, wind turbine blades 12 are typically constructed with a plurality of shear webs 33 disposed in an interior portion thereof that run substantially the length of the tip section, and are bonded at a first edge to a top (or front) wall of a turbine blade and at an opposing second edge to a bottom (or back) wall of the turbine blade. Shear webs 33 add rigidity and/or torsional stiffness to the blade 12, and help maintain the airfoil, or uneven teardrop, cross sectional shape of the blade 12 resulting in a significant amount of empty space/volume within the blade 12. Accordingly, these shear webs 33 also prevent the tip subsections 24 from being easily flattened when being decommissioned. Accordingly, in some embodiments, the tip subsections 18 can be cut longitudinally 32 along their length adjacent locations at which one or more shear webs 33 are bonded to either of a top or bottom wall of each such tip subsection 24. In this manner, the internal shear webs 33 that may otherwise make it difficult to flatten each tip subsection can be cut out of, or separated from, an outer wall of each tip subsection 24, making it easier to flatten the tip subsection 24 and eliminate the empty space/volume within each tip subsection 24.

Figure 8:
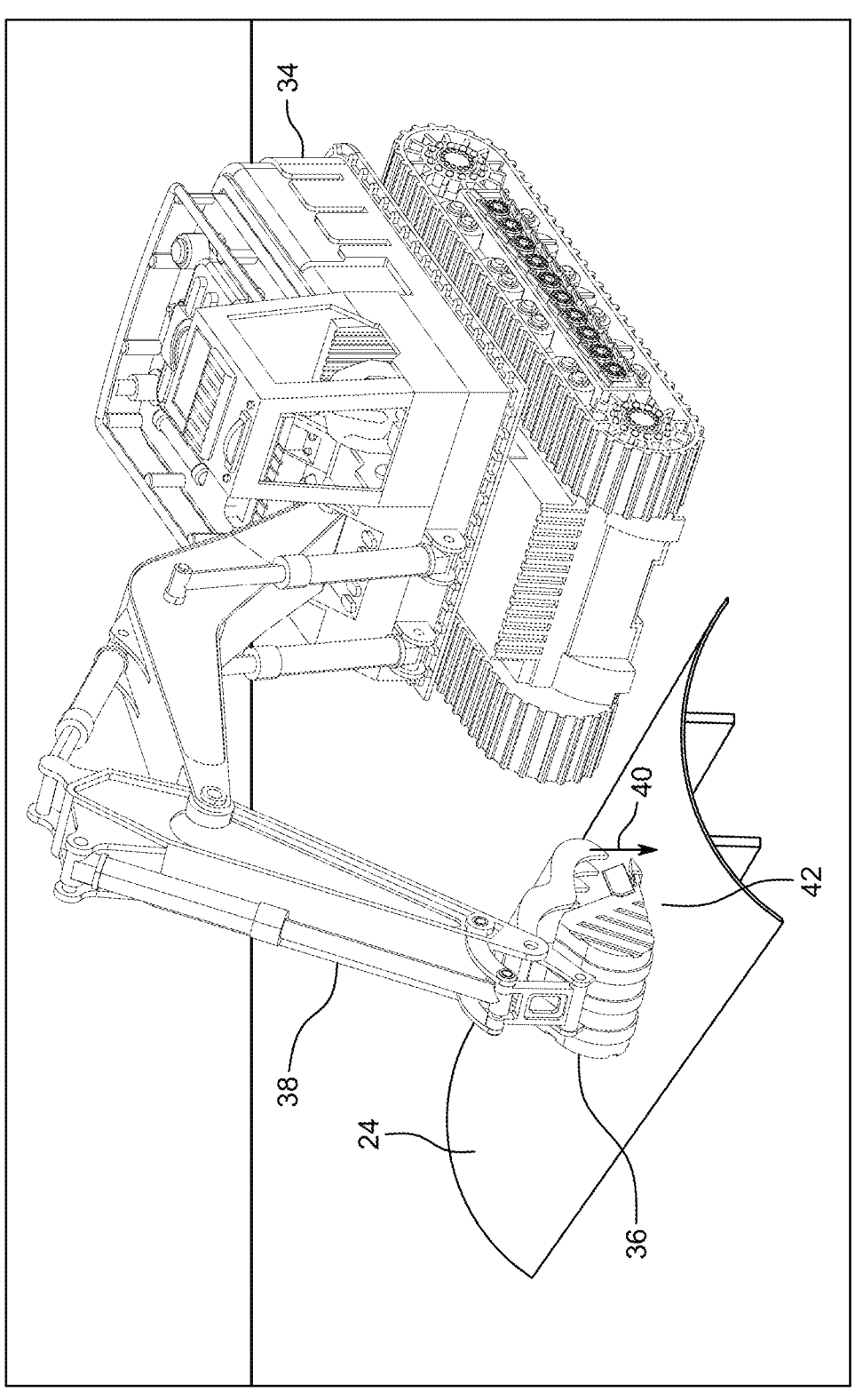
FIG. 8 is a schematic perspective view of an embodiment of an excavator applying a downward force and flattening a portion of a longitudinally cut tip subsection.

Referring to FIG. 8, after the longitudinal cuts 32 have been made to the tip subsections 24 and they have been weakened thereby or fully cut into smaller pieces, another heavy equipment vehicle 34, such as a forklift or excavator with a bucket, grappler, or other such apparatus 36 attached to an arm 38 of the vehicle 34, is used to apply a force 40, directed generally vertically downward, on the top side 42 of each tip subsection 24 to compress and/or flatten each of the tip subsections 24 or smaller pieces thereof (see FIG. 9) as much as possible. In this manner, each flattened tip subsection 24 or piece thereof becomes much easier to stack together, while having simultaneously eliminated a majority of the empty space or interior volume that had previously occupied the interior of each tip subsection 24.

Figure 10:
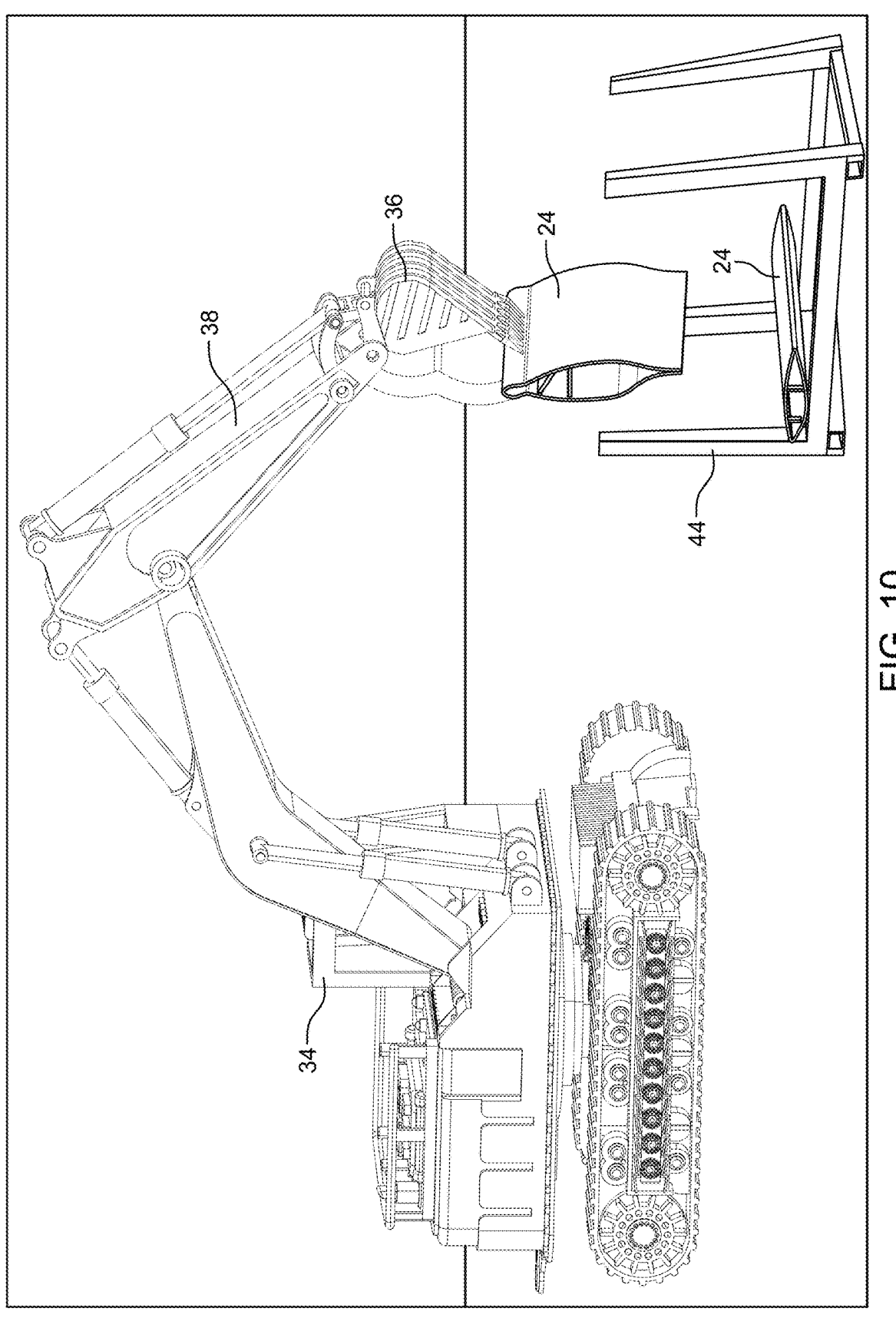
FIG. 10 is a is a perspective view of an embodiment of an excavator depositing a cut and flattened section of a tip subsection of a turbine blade into a compacting and bundling apparatus.
Figure 11:
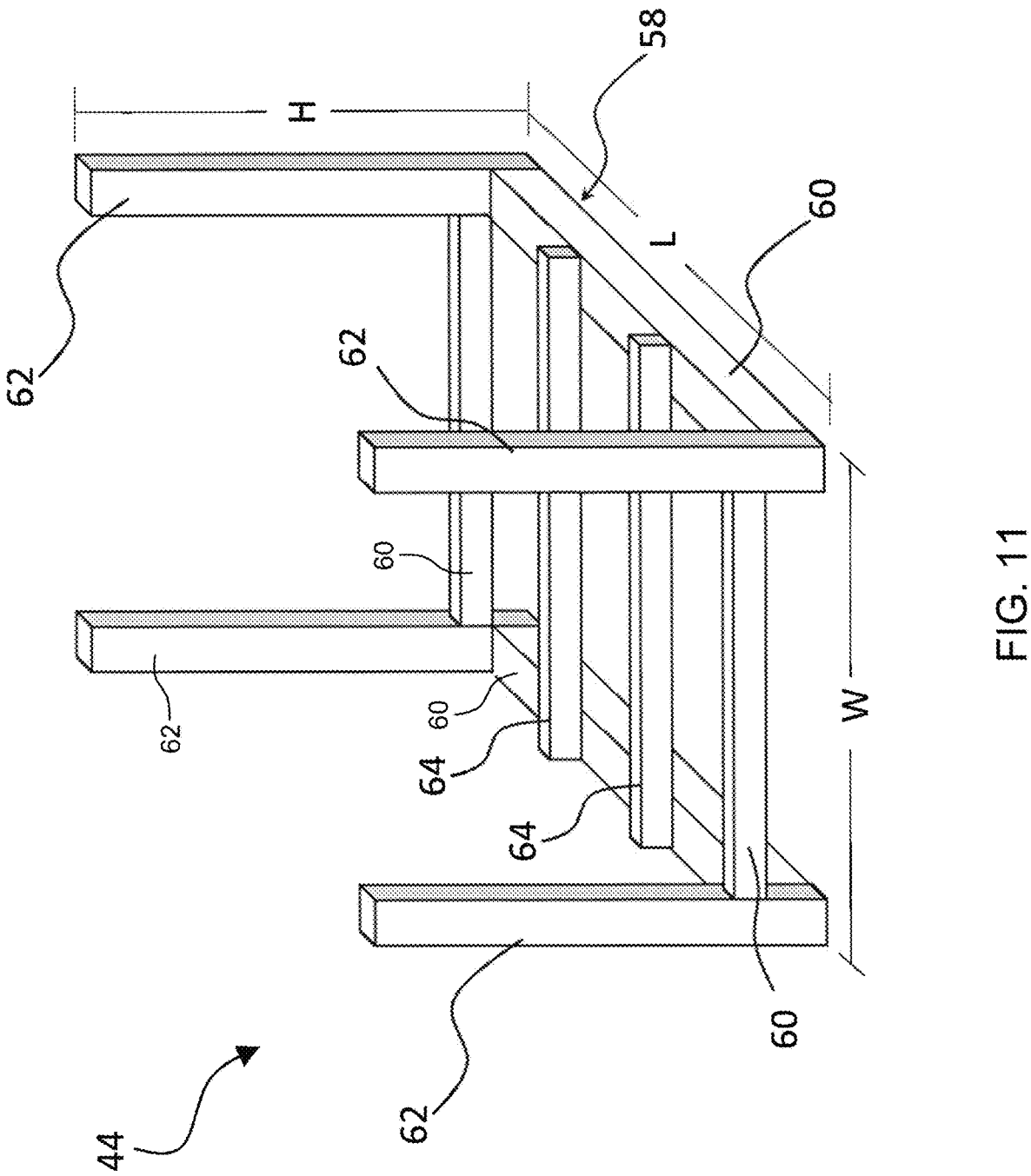
FIG. 11 is a schematic perspective view of an embodiment of a compacting and bundling apparatus of the present disclosure.
Figure 12:
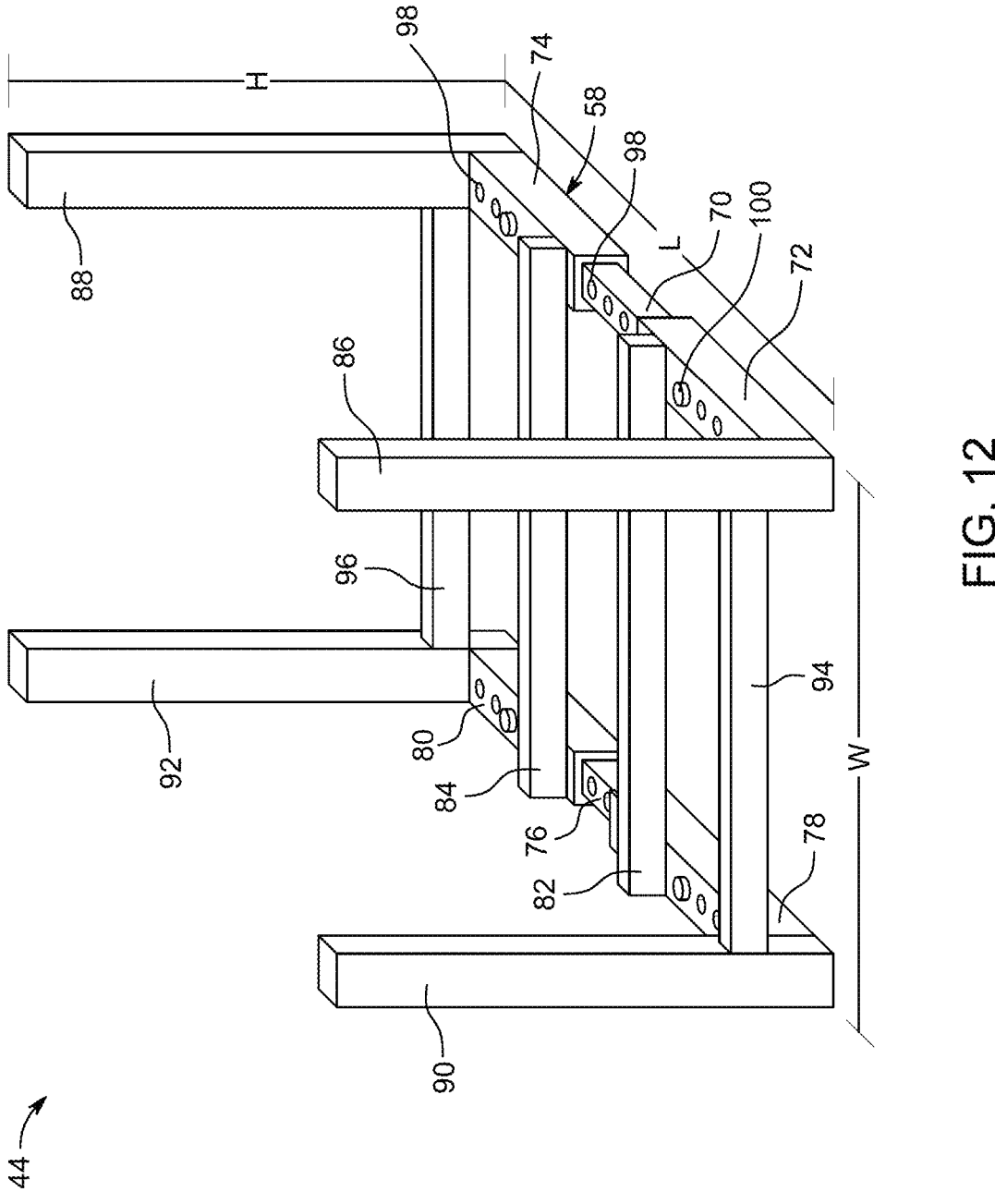
FIG. 12 is a schematic perspective view of an alternate embodiment of a compacting and bundling apparatus of the present disclosure, in which a length of the apparatus is adjustable.

Referring to FIGS. 10-12, the method then further continues by placing or depositing 46 the resulting flattened tip subsections 24, or flattened pieces thereof, into a compacting and bundling apparatus 44 (as will be described in further detail below). The compacting and bundling apparatus 44, as will be discussed in greater detail below, is designed and configured to permit both vertical and horizontal forces to be applied to the flattened tip subsections 24, in order to further compact the tip subsections 24 and prepare multiple tip subsections 24 for banding to form a manageable bundle of cut and compacted turbine blade sections. The process or method continues, as mentioned above, with a worker placing one or more cut and flattened tip subsections 24 into the compacting and bundling apparatus 44. The worker can use an excavator with a grappler attached to move the flattened tip subsections 24 from a staging area to the compacting and bundling apparatus 44.

Figure 13:
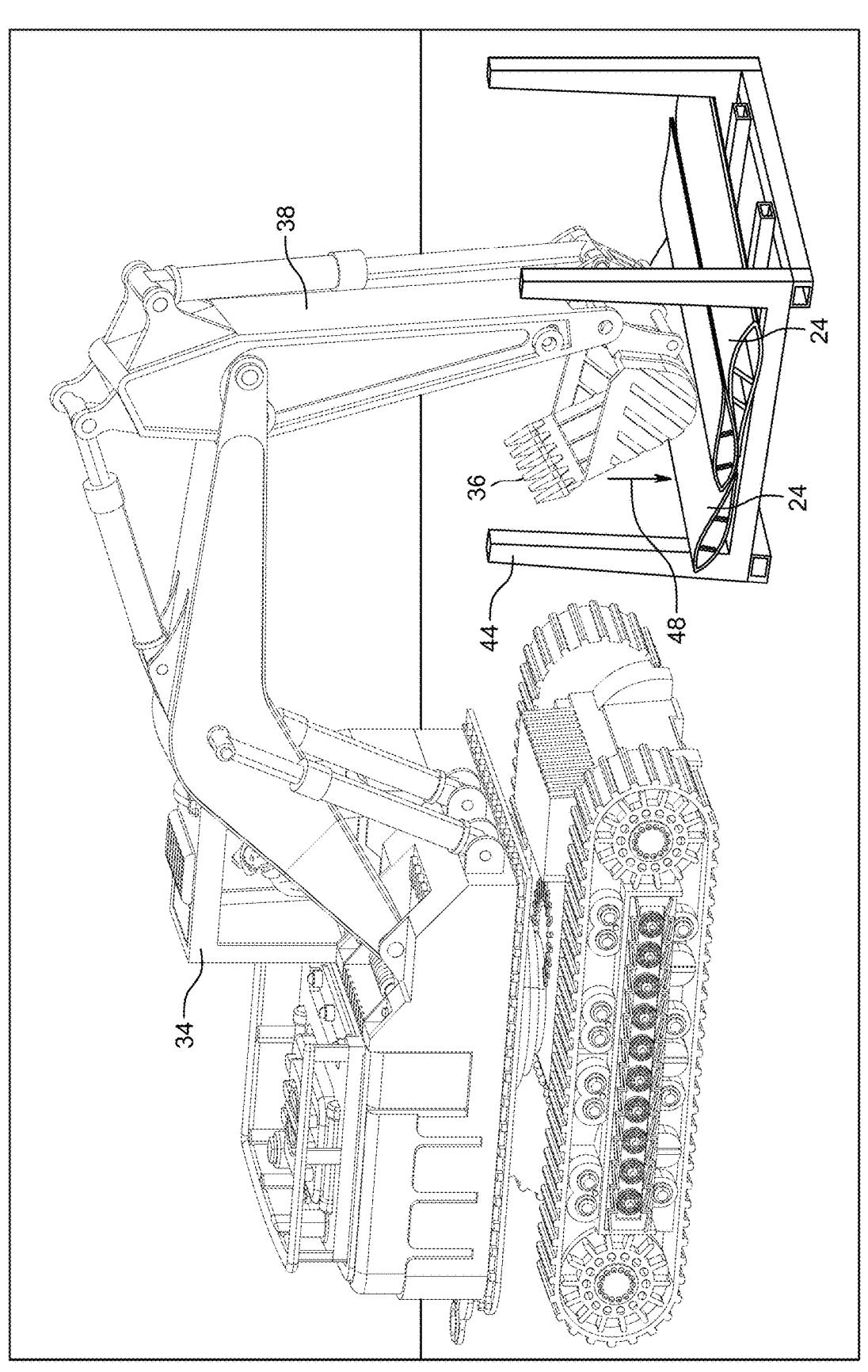
FIG. 13 is a schematic perspective view of an embodiment of excavator compacting a cut and flattened section of a turbine blade after being loaded into the compacting and bundling apparatus.

Referring to FIG. 13, next, a downward force 48 is applied on the one or more flattened tip subsections 24 to further compress and/or compact the tip subsections 24. The downward force 48 can be applied by any industrial equipment, such as for example an excavator, bucket loader, or backhoe, capable of applying the downward forces needed to compress and/or compact the tip subsections 24 to a substantially flattened state in the compacting and bundling apparatus 44, without departing from the scope of the present disclosure. In one embodiment, the downward force 48 is applied by the same second heavy vehicle 34 that places each flattened tip subsection 24 into the compacting and bundling apparatus 44.

Figure 14:
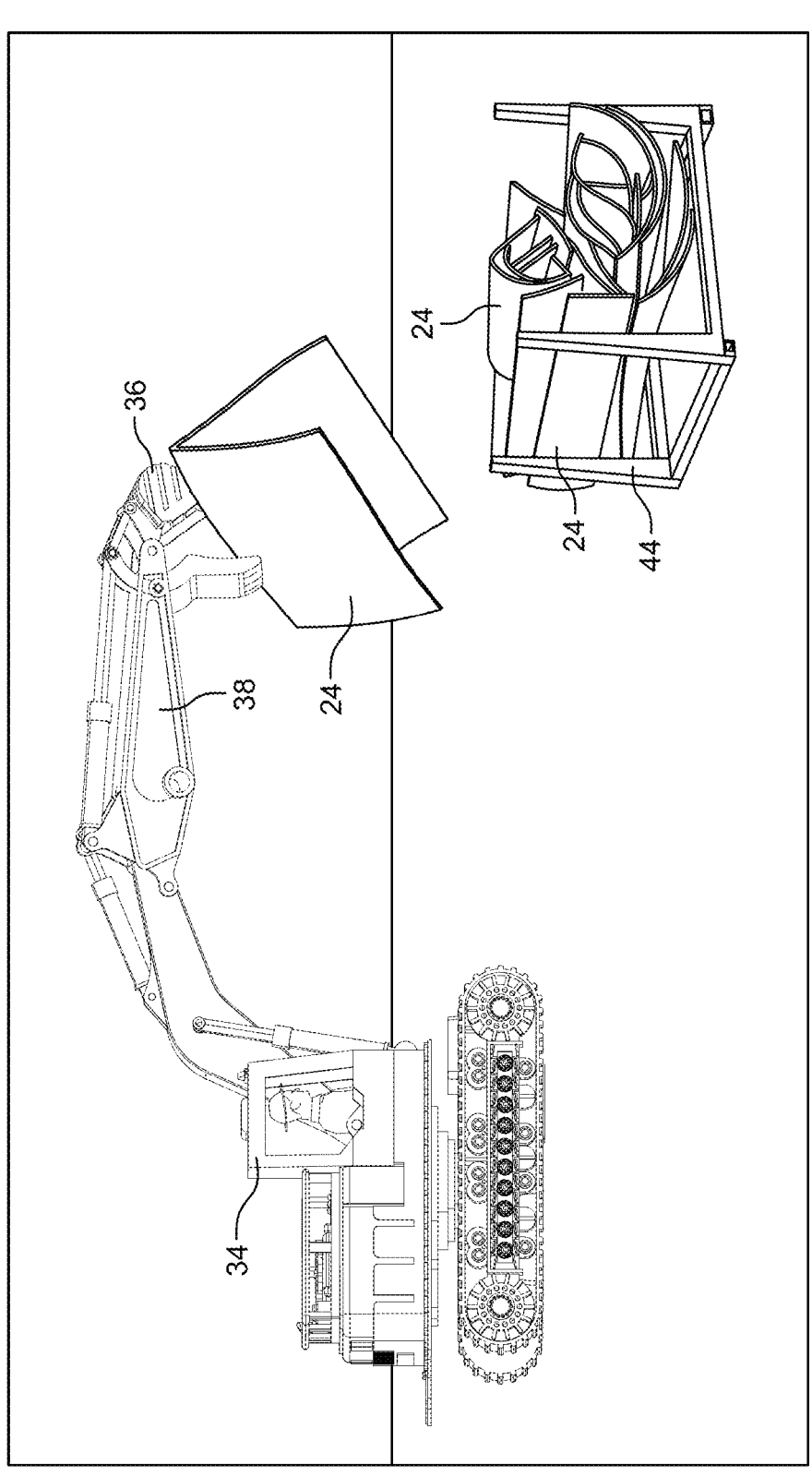
FIG. 14 is a perspective view of an embodiment of an excavator depositing additional cut and flattened tip subsections of a turbine blade, and/or pieces thereof, onto a stack of tip subsections already deposited into a compacting and bundling apparatus.
Figure 15:
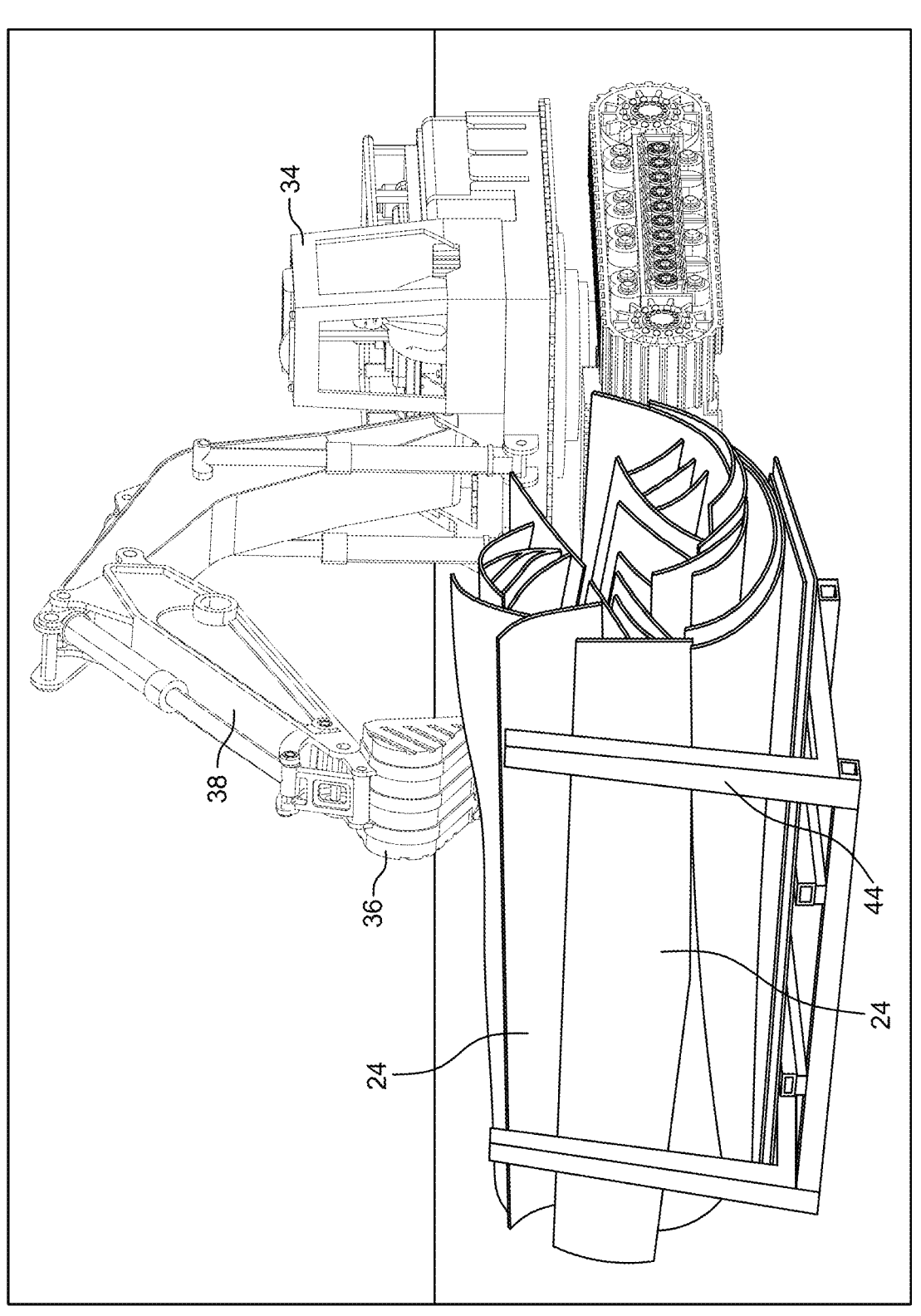
FIG. 15 is a schematic perspective view of an embodiment of an excavator compacting a number of cut and flattened tip subsections of a turbine blade, and/or pieces thereof, stacked in a compacting and bundling apparatus.
Figure 16:
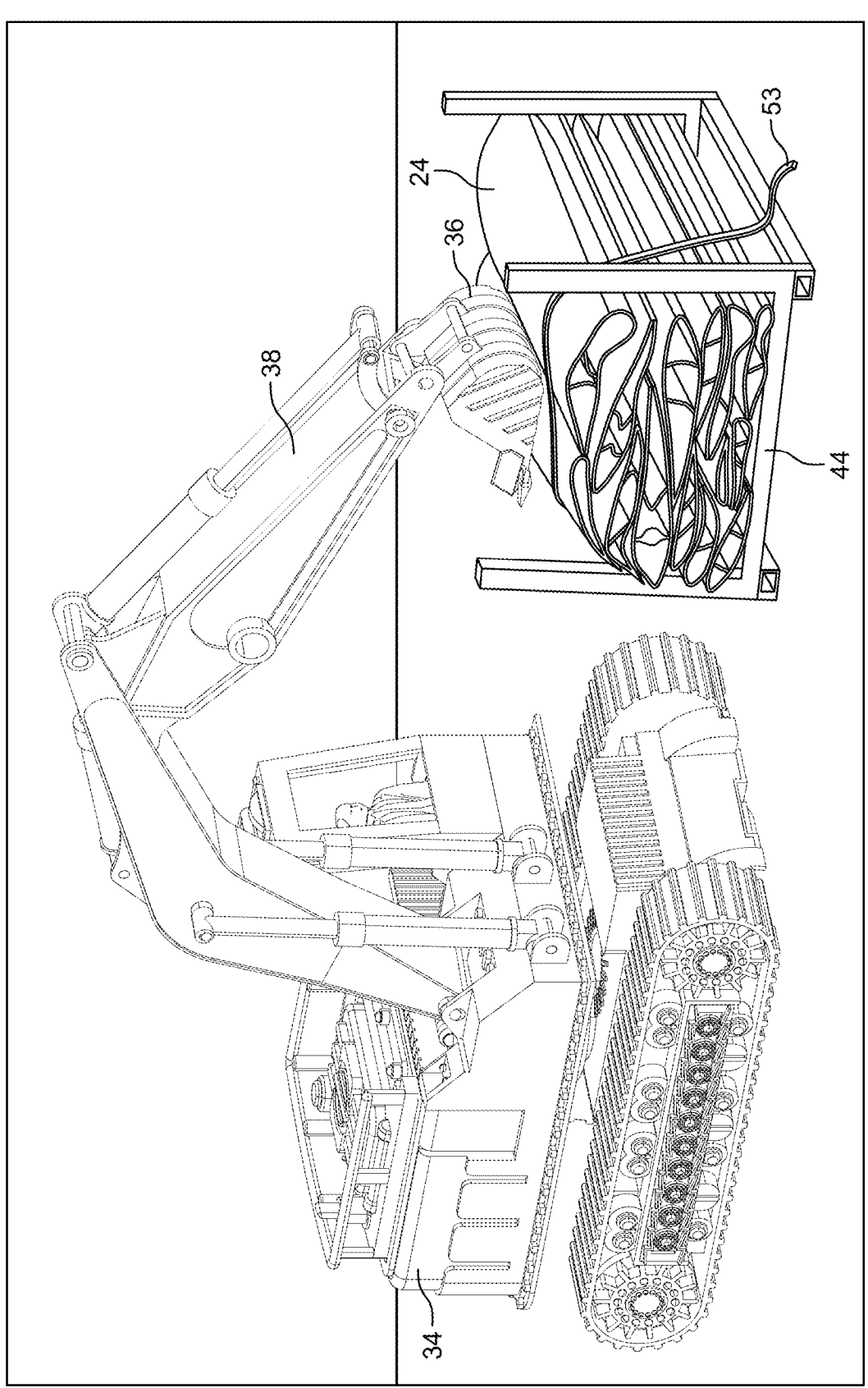
FIG. 16 is another schematic perspective view of an embodiment of an excavator compacting a number of cut and flattened tip subsections of a turbine blade stacked in a compacting and bundling apparatus.

The process continues, with reference to FIGS. 14-16, by placing additional flattened tip subsections 24 in the compacting and bundling apparatus 44, stacked on top of other flattened and compressed/compacted tip subsections 24 that were previously deposited in the compacting and bundling apparatus 44 (see FIG. 14). Thereafter, the operator continues by further compressing those newly added tip subsections 24 (see FIGS. 15 and 16), together with those tip subsections lying underneath, and repeating the process of alternatingly stacking and compressing tip subsections 24 in the compacting and bundling apparatus 44 until the stack of flattened and compressed tip subsections 24 reaches a top of the compacting and bundling apparatus 44, or alternatively a desired height within the compacting and bundling apparatus 44. The compacting and bundling apparatus 44 applies horizontal (i.e. lateral, or from the sides) and upward vertical (i.e. from below) resistance against the downward compression forces applied to the stack of tip subsections 24 by the industrial equipment or excavator, so that the resulting collection of compacted/compressed tip subsections 24 is generally shaped as a cuboid (i.e., a "rectangular cube") of cut, flattened, and compressed blade materials that are stacked on top of, and laterally next to, each other.

Figure 17:
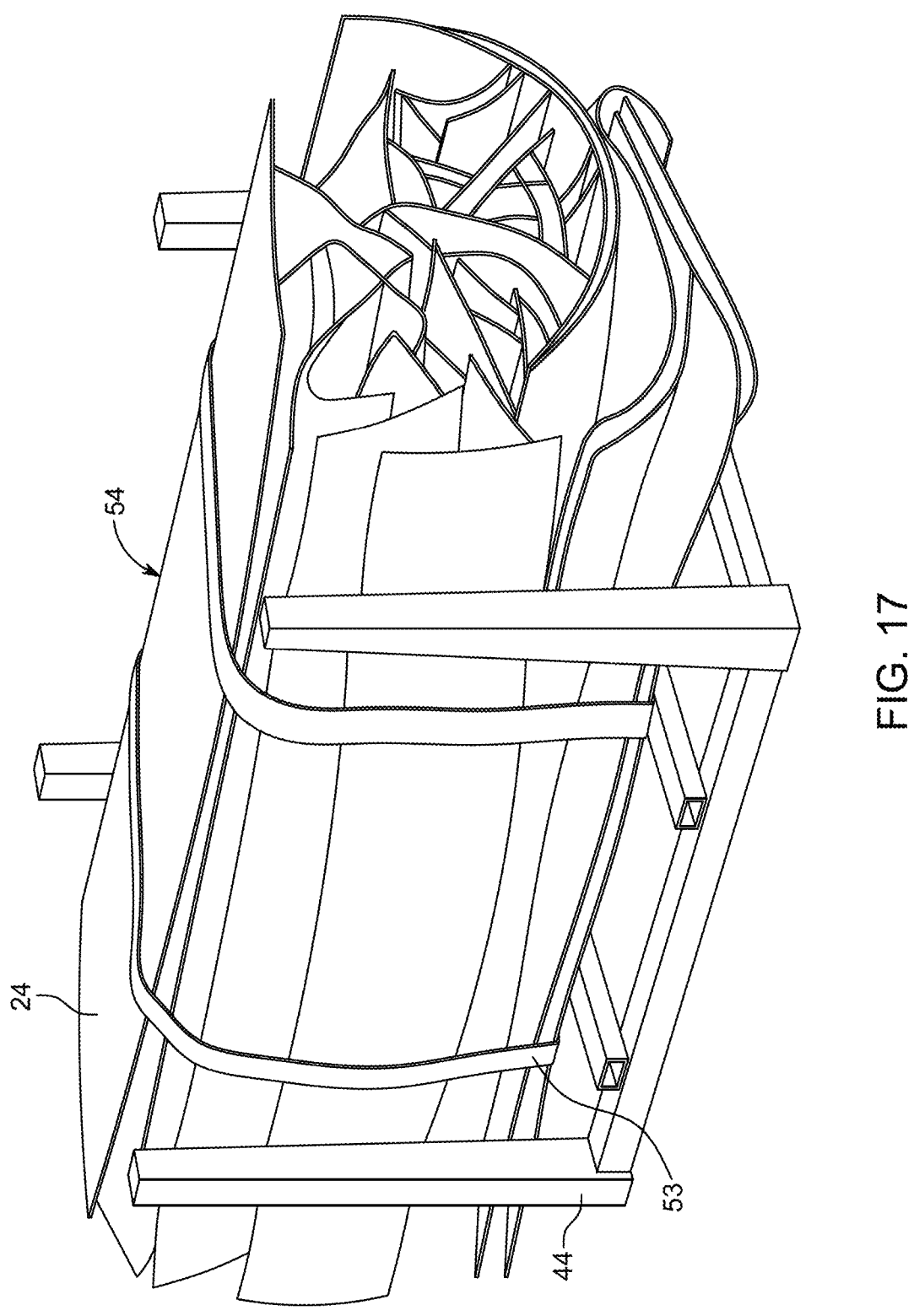
FIG. 17 is a schematic perspective view of an embodiment of a compressed/compacted banded bundle of tip subsections of a wind turbine blade of the present disclosure.

Referring to FIGS. 16-17, the process or method then continues by wrapping 52 lengths of banding (or strapping) 53 tightly around the flattened and compressed collection of tip subsections 24 and securing the ends of banding 53 to form a bundle 54 of tip subsections 24 in the general shape of a rectangular cube. In some embodiments, the lengths of banding 53 can be wrapped tightly around the tip subsections at the same time as the heavy equipment is compressing the bundle of tip sub sections 24 to eliminate as much empty space, and thereby reduce the overall volume in the resulting bundle, as possible. The banding is a high tensile strength material, such as for example steel bands/straps/strapping, high tensile polymer or aramid yarn straps, reusable heavy duty ratchet straps, or the like. The banding 53 holds the tip subsections 24 tightly bundled in the rectangular cube shape, once the bundle 54 is removed from the compacting and bundling apparatus 44. The specific shape and/or dimensions of the resulting rectangular cube bundle 54 is largely defined by both the shape and dimensions of the compacting and bundling apparatus 44 and a cut length of the tip subsections 24.

Figure 18:
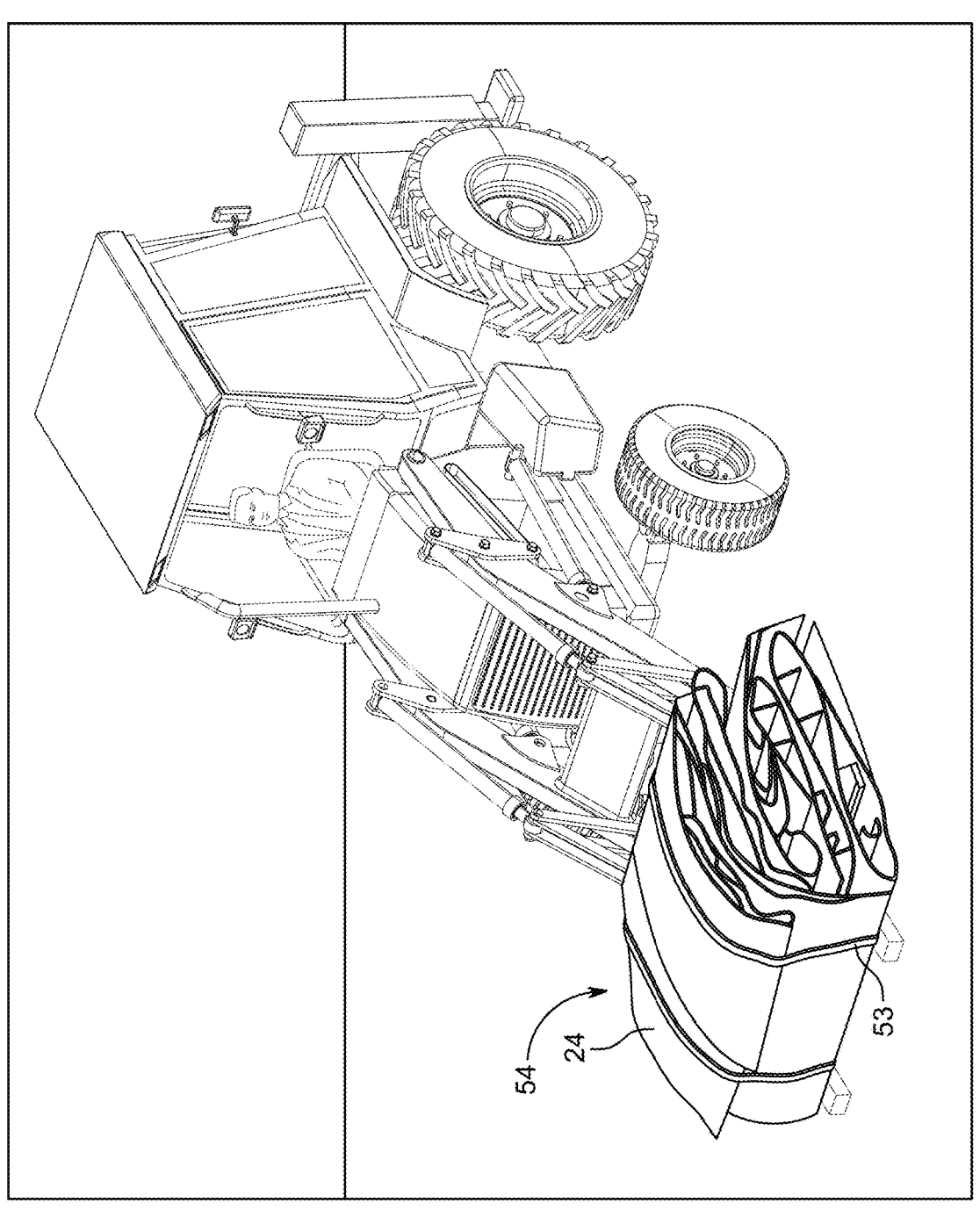
FIG. 18 is a schematic perspective view of an embodiment of a banded bundle of tip subsections of a wind turbine blade of the present disclosure, removed from the compacting and bundling apparatus and being transported by a forklift to a transportation vehicle.
Figure 19:
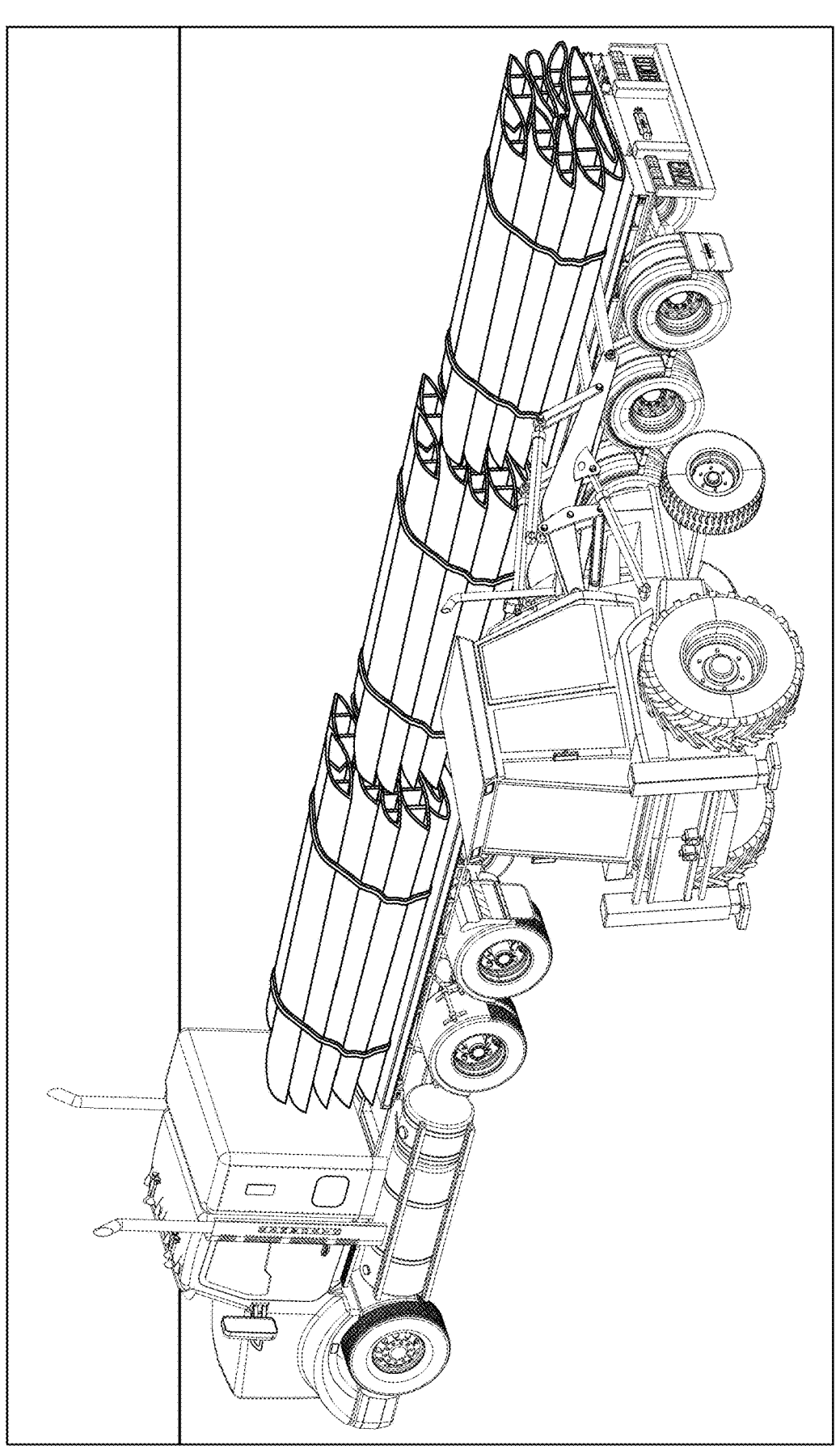
FIG. 19 is a schematic perspective view of an embodiment of a banded bundle of tip subsections of a wind turbine blade of the present disclosure being loaded onto a flatbed truck for transportation to a desired location, together with two other banded bundles that have previously been loaded onto the flatbed truck.

Referring to FIGS. 18-19, the resulting banded rectangular cube bundle 54 is next removed 55 from the compacting and bundling apparatus 44 using a forklift, or overhead crane, or other similar vehicle or equipment, so additional flattened tip subsections 24 can thereafter be added to the empty compacting and bundling apparatus 44 and additional banded rectangular cube bundles 54 of flattened and compressed tip subsections can be formed. The banded rectangular cube bundles 54 can then be loaded 57 onto a flatbed truck 56, secured to the flatbed truck 56, and transported 59 to a desired location. As noted above, turbine blades 12 are often destined for a recycling facility to recycle the fiberglass and other materials comprising the blades. However, because such fiberglass recycling facilities may be hundreds or thousands of miles from the wind turbine farm, it is critical that the turbine blades be arranged as compactly and securely as possible to make the trip efficient, safe, and effective. The banded bundles 54 formed by the methods and apparatus described herein are dense rectangular cubes that are banded in a manner that not only makes each buddle physically stable but are shaped and sized in a manner that makes it easy and safe to secure the bundles 54 to a flatbed truck 56 for interstate transit.

The drawing figures illustrate further additional details of the methods disclosed herein of forming a banded bundle 54 of sections of a decommissioned wind turbine blade 12 and a compacting and bundling apparatus 44 for use in such method, as described herein. FIG. 5 depicts cut tip subsections 24a, 24b. As is illustrated by comparison of the two cut tip subsections 24a, 24b in FIG. 5, tip subsections can have significantly differed overall shapes, depending on where they were located along the length of the wind turbine blade 8. The tip subsection 24b is a section that was connected to, and extended from, the root section 16 and has a first end with a generally circular longitudinal cross sectional shape where it attached to the root section 16, and which tappers to a second end having a generally teardrop or airfoil shaped longitudinal cross section. The tip subsection 24a is a section that was initially a portion of the overall main body of the tip section 18 of the turbine blade 12 and has a generally consistent teardrop or airfoil shaped cross section along its longitudinal length. The differences in the shapes of the tip subsections 24a, 24b may determine the method of applying longitudinal cuts to each such tip subsection, as well as the number and location of cuts to be applied thereto.

Once the tip section 18 is cut into 15-20 foot long tip subsections 24, a forklift or other such heavy equipment can arrange the tip subsections 24 for longitudinal cutting. FIG. 5 depicts an excavator 30 equipped with a circular saw 40 making an initial cut in tip subsections 24a. As shown in the figure, the initial cut to each tip subsection 24 is generally a longitudinal through-cut made through the entire thickness of the outer wall of the subsection, that runs the entire length of the tip subsection 24, and serves to cut the respective tip subsection 24 open for further cutting and reduction in size. The shape of the tip subsection 24 may determine the location of the initial cut. Once the initial cut is made, if needed, a forklift or other similar vehicle can reposition the tip subsection 24 for additional longitudinal cuts. FIGS. 6-7 depict the circular saw 40 making additional longitudinal cuts to a repositioned tip subsection 24b.

Figure 9:
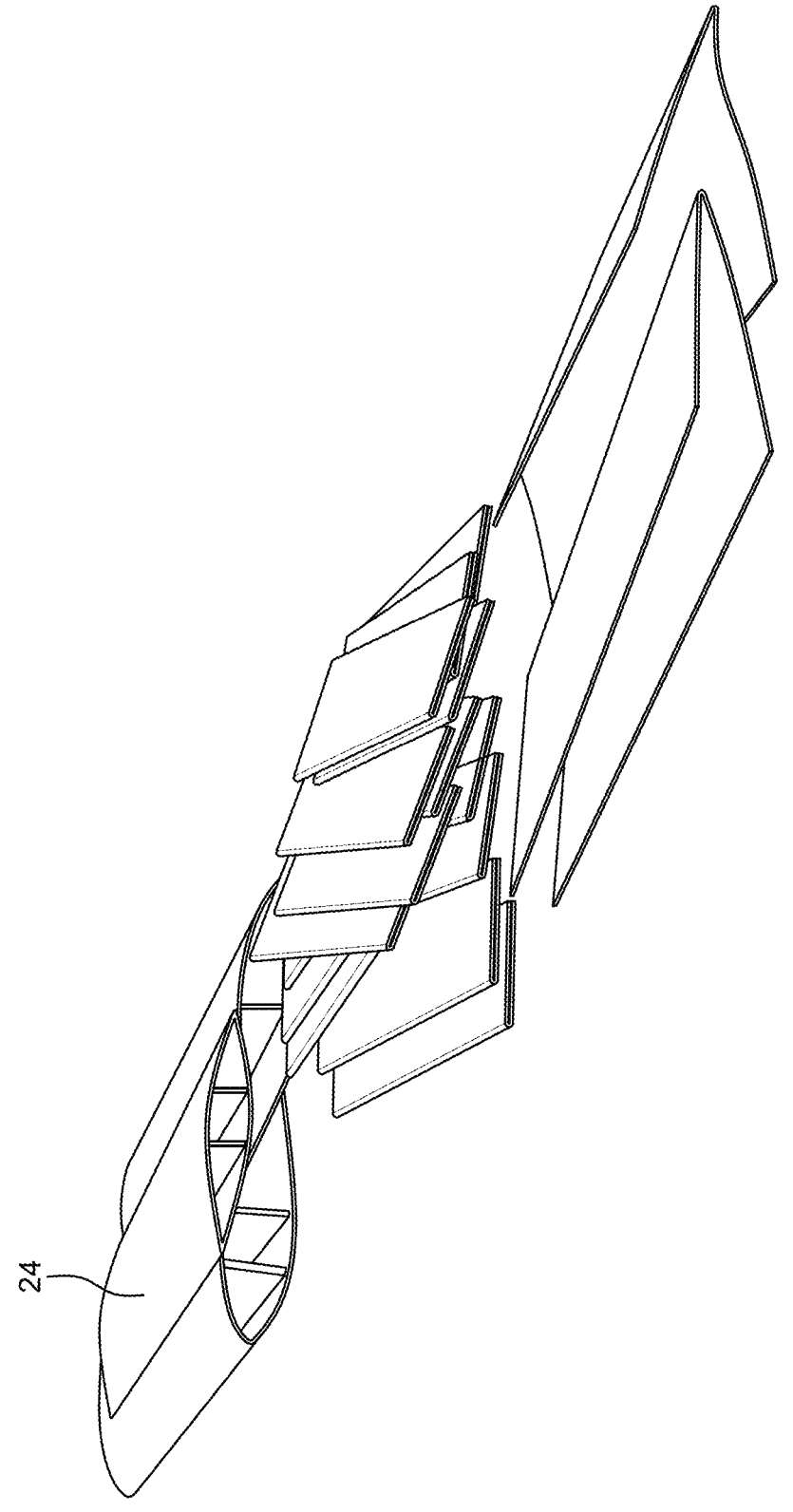
FIG. 9 is a schematic perspective view of an embodiment of a number of flattened cut sections of a turbine blade.

Once the longitudinal cuts are made in a number of tip subsections, a forklift or other similar heavy equipment can move the cut tip subsections to a central location. Once centrally located, the forklift, excavator with a grappler or bucket, or other similar heavy equipment can be used to apply a downward force on the top of the cut tip subsections to flatten the tip subsections 24. FIG. 9 depicts such a collection of flattened cut tip subsections.

FIG. 11 schematically illustrates an embodiment of a compacting and bundling apparatus 44 used to form and bundle an efficiently packed rectangular cube shaped bundle 54 of turbine blade materials. The compacting and bundling apparatus 44 includes a base 58 formed by a plurality of base members 60, a plurality of post members 62 secured to and rising vertically upward from the base 58, and a plurality of cross members 64 extending horizontally from one portion of the base 58 to the opposite portion on the base 58. In one embodiment, the compacting and bundling apparatus 44 is made from four base members 60 coupled together to form a rigid rectangle, four post members 62, and two cross members 64, however alternate numbers of base members 60, post members 62, and cross members 64 may be used in alternate embodiments without departing form the scope of the present disclosure. All of the members 60, 62, and 64 of the compacting and bundling apparatus 44 are secured together through welding, fasteners (i.e. such as, for example, bolts), or combinations thereof. All the members 60, 62, and 64 are formed from high strength steel or other similar material suitable to withstand the compacting forces applied to the tip subsections 24 by heavy vehicles. The base 58 and cross members 64 form a "floor" that resists downward movement of tip subsections 24 as they are compressed in the compacting and bundling apparatus 44, and the posts 62 work cooperatively to resist horizontal movement during such compression. In one exemplary embodiment, the overall height (H) of the compacting and bundling apparatus 44 is approximately 12 feet, the overall length (L)

is approximately 15 feet, and the width (W) is approximately 8 feet. These specific dimensions are designed for the bundling of turbine blades 12 that are approximately 162 feet in length. However, it will be understood that the dimensions of the compacting and bundling apparatus 44 can and will change based on the particular type and length of turbine blade 12 handled by the compacting and bundling apparatus 44, and the type of vehicle used to transport such bundles 54, without departing from the scope of the present disclosure.

In another embodiment, the compacting and bundling apparatus 44 is constructed and configured to be adjustable, such that its dimensions, or the dimensions between the posts 62, can vary or be adjusted as needed or desired in order to adjust the dimensions of a final bundle 54. For example, in one embodiment, the base 58 and posts 62 are configured such that the posts 62 are slidingly movable or repositionable with respect to, or can be slid along, one or more portions of the base 58 or base members 60 and can also be selectively secured at various locations on the base 58 to adjust a length L and/or width W between the posts 62 of the compacting and bundling apparatus 44. In one embodiment for example (not depicted), the post members 62 may each have a section of square tubing disposed at a bottom end thereof that extends horizontally or laterally about a horizontal axis, with the open ends of the square tubing facing sideways. A base member 60 is slidingly disposed through the open ends of each section of square tubing, such that each post member 62, and its square tubing bottom end, can be slidingly moved along one of the base members 60. Once at a desired location on the base members 60, each post member 62 can be secured in place to the base 58, for example by a pin, or set screw, or the like.

In an alternate embodiment of the compacting and bundling apparatus 44, the base members 60 may each have a series of vertically arranged openings or holes defined in a top side thereof along their length, spaced evenly apart, and the bottom ends of the post members 62 can be vertically inserted into one of the openings at a desired location along the base members 60. In this manner, the positioning of the post members 62 is adjustable by removing a post member 62 from one vertical hole in the base member, and moving it to another vertical hole in the base member 60. When the length L between the post members 62 is adjusted, for example to accommodate longer or shorter lengths of flattened tip subsections 24, one or more additional cross members 64 can be added to or removed from the base 58, as needed. When the width W is adjusted to increase the width thereof between the post members 62, for example in order to accommodate a wider tip subsection placed in the compacting and bundling apparatus 44 or create a wider bundle 54, a second set of longer cross members can be employed to span the width of the base 58. Similarly, the width W between the posts can be narrowed to create bundles 54 of smaller width, and shorter cross members can be installed to span the narrower width of the base 58.

Referring to FIG. 12, in yet another embodiment of the compacting and bundling apparatus 44, the base 58 is made from hollow steel tubing, and may include a first telescoping inner tube 70 that is slidingly disposed within an inner hollow space of each of a colinearly arranged first base member 72 and second base member 74, such that complementary ends of the first and second base members 72, 74 can be slidingly moved closer to, or further apart from, each other along a first longitudinal axis of the first telescoping inner tube 70. A second telescoping inner tube 76 is slidingly disposed within the inner hollow space of each of a colinearly arranged third base member 78 and fourth base member 80, such that complementary ends of the third and fourth base members 78, 80 can be slidingly moved closer to, or further away from, each other along a second colinear longitudinal axis that is parallel to the first longitudinal axis. At least a first cross member 82 is rigidly affixed at opposing ends thereof to a top of each of the first and third base members 72, 78, and at least a second cross member 84 is rigidly affixed at opposing ends thereof to a top of the second and fourth base members 74, 80. The cross members can be welded to their respective base members, or can be secured via bolts or other similar fasteners. In one embodiment, the cross members 82, 84 are each parallel to each other, and perpendicular to each of the first, second, third, and fourth base members 72, 74, 78, and 80, so as to be arranged in a rectangular ladder-like structure. At each corner of the base 58 is disposed one of four vertical posts that are rigidly affixed to a respective end of one of the first, second, third, and fourth base members 72, 74, 78, and 80. A first post member 86 is affixed to the end of the first base member 72 at a first corner, a second post member 88 is affixed to the end of the second base member 74 at a second corner, a third post member 90 is affixed to the end of the third base member 78 at a third corner, and a fourth post member 92 is affixed to the end of the fourth base member 80 at a fourth corner. In some embodiments, the post members 86, 88, 90, 92 are affixed to the ends of their respective base members 72, 74, 78, 80 by one or more bolts, or other removable fasteners that can be selectively disconnected to disassemble the compacting and bundling apparatus 44 for case of transportation, for example on a flatbed truck. A fifth base member 94 is arranged parallel to the cross members 82, 84 and is rigidly, but removably, coupled between the first and third vertical posts members 86, 90. And a sixth base member 96 is arranged parallel to the cross members 82, 84, and is rigidly but removably coupled between the second and fourth post members 88, 92. The fifth and sixth base members may be coupled to their respective post members via bolted connections. Accordingly, the compacting and bundling apparatus 44 is essentially split into two rigid halves that can slide closer to or further apart from each other about the first and second telescoping inner tubes 70, 76 in a direction parallel to the first and second longitudinal axes of the first and second telescoping inner tubes 70, 76. In this manner, the length L of the apparatus 44 is adjustable to accommodate longer lengths of tip subsections to be compressed and bundled therein. In addition, in some embodiments, a plurality of holes 98, spaced apart at regular intervals, are defined in the top surface of each of the first and second telescoping inner tubes 70, 76, and also in the first, second, third, and fourth base members 72, 74, 78, 80. The holes 98 in the telescoping inner tubes may be aligned with the holes 98 in the respective four base members 72, 74, 78, 80 and pins 100 may be inserted into the aligned holes 98 to pin the position of the base members 72, 74, 78, 80 to the inner telescoping tubes 70, 76, thereby temporarily fixing or securing a length L of the compacting and bundling apparatus 44.

Furthermore, the compacting and bundling apparatus 44 may be disassembled, for example in one embodiment by unscrewing the bolted connections between base members and the vertical post members, so that the vertical post members can be laid flat on top of the base 58, and the overall compacting and bundling apparatus 44 can be easily broken down to be transported on a flatbed truck to a work site. The principles described herein are broad and encompass designs and arrangement beyond the specific examples and embodiments described herein.

FIGS. 10 and 13-16 depict the loading of tip subsections 24 into a compacting and bundling apparatus 44 and the compaction/compression of those tip subsections 24 into rectangular cubes or bundles 54. In one embodiment (not depicted), flattened tip subsections 24 can be lined up in a staging area making it efficient for an operator of an excavator equipped with a grappler to place tip subsection into the compacting and bundling apparatus 44. FIG. 10 depicts an excavator depositing a flattened tip subsection 24 in a compacting and bundling apparatus 44, and FIG. 13 depicts the excavator using the grappler to further compress the tip subsections 24 once inside the compacting and bundling apparatus 44. FIGS. 14-15 depict the excavator further filling up the compacting and bundling apparatus 44 with additional tip subsections 24 until the collection of tip subsections 24 reaches the top of the post members 62 of the compacting and bundling apparatus 44. As depicted in FIG. 16, once the compacting and bundling apparatus is fully loaded, the excavator can apply force to the top of the stack or collection of tip subsections 24 within the compacting and bundling apparatus 44 and one or more bands 53, for example steel bands or bands/straps made of alternate materials that have a sufficient durability and tensile strength, can be tightly and securely wrapped around the collection of tip subsections 24 that are held within the compacting and bundling apparatus 44 to form a bundle 54. FIG. 17 depicts a banded bundle of tip subsections 24 in the compacting and bundling apparatus 44. The use of the compacting and bundling apparatus 44 results in a repeatable method for forming a standard sized banded bundle 54 that is significantly compacted and is ready for transporting to the desired end location.

Once the banded bundle 54 is formed, a forklift or other similar heavy equipment can remove the banded bundle 54 from the compacting and bundling apparatus 44. If the forklift is tasked with the removal, the lifting forks of the forklift are inserted into the compacting and bundling apparatus 44 beneath a bottom surface of the bundle 54, and the lifting forks lift the bundle 54 out of the compacting and bundling apparatus. More specifically, the forks of the forklift are inserted into the space defined laterally adjacent each cross members 64, and between an upper surface of the base members 60 perpendicular to the cross members 64, and a top surface of the cross members 64 on which the bundle 54 is resting. The forklift then lifts the bundle 54 from a bottom side thereof, up and over the top of the post members 62 of the compacting and bundling apparatus 44, and moving (See FIG. 18) the banded bundle 54 to a desired location. The banded bundles 54 can be deposited in a staging area for loading onto a flatbed truck in the future or can be transported directly to the flatbed truck for transit to the desired location. FIG. 19 depicts the loading of a banded bundle 54 onto a flatbed truck configured to be loaded with three banded bundles 54 of tip subsections 24 for transit to a desired location. It will be appreciated that the three banded bundles 54 depicted in FIG. 19 represent up to three decommissioned turbine blades 12 loaded onto a single flatbed truck. This represents a significant improvement over current processes, which inefficiently load a single turbine blade 12 onto each flatbed truck, and therefore requires three separate trucks for a three-blade wind turbine. It will further be appreciated that, as depicted in FIG. 19, the bundles are sized and shaped for convenient movement with a common heady duty forklift without the need for extra equipment or operator expertise. This makes the loading and unloading of the flatbed truck significantly easier than the current transport methods.

Referring to FIG. 20, a flow chart is shown depicting an embodiment of a complete method or process for decommissioning the blades of a wind turbine, as previously described herein. The method includes first decoupling 10 the turbine blades from the hub of a wind turbine, and lowering 14 each turbine blade to the ground. Next the method continues by, for each turbine blade, separating 21 a root section of the turbine blade from the tip section of the turbine blade, and cutting the tip section laterally 22 to a longitudinal axis of the turbine blade into a plurality of tip subsections. Each tip subsection is then cut longitudinally along their length 32. Each tip subsection is then flattened 40 by applying a force to the top side of the longitudinally cut tip subsections. The method continues by depositing 46 the flattened tip subsections into a compacting and bundling device, and compressing and compacting 48 the tip subsections by applying a downward force thereto. The method continues by repeating 50 the steps of depositing tip subsections, and compacting and compressing the tip subsections until a stack of tip subsections is created in the compacting and bundling apparatus that reaches a desired height. The method continues by next wrapping 52 lengths of banding material tightly around the compressed tip subsections to form a bundle of tip subsections. The banded bundle of tip subsections is removed 55 from the compacting and bundling apparatus and loaded 57 onto a transportation vehicle where it is transported 59 by the vehicle to a desired location for further processing.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. A method of decommissioning industrial-scale wind turbine blades, comprising:

separating a root section of a turbine blade from a tip section of the turbine blade;

laterally cutting the tip section of the turbine blade into a plurality of separate tip subsections;

longitudinally cutting at least one tip subsection along its length;

depositing the tip subsections into a compacting and bundling apparatus;

compressing and compacting the tip subsections in the compacting and bundling apparatus;

bundling the compressed and compacted tip subsections with banding material to form a bundle of tip subsections;

removing the bundle from the compacting and bunding apparatus; and loading the bundle onto a transportation vehicle.

2. The method of claim 1, further comprising:

decoupling the turbine blade from a wind turbine hub; and lowering the turbine blade to the ground.

3. The method of claim 1, wherein the separating step is performed by cutting the root section from the tip section of the turbine blade.

4. The method of claim 1, further comprising:

repeating the steps of depositing, and compressing and compacting the tip subsections, until a stack of tip subsections is created in the compacting and bundling apparatus.

5. The method of claim 1, wherein the compacting and bundling apparatus includes a rectangular base, four corner posts coupled to each of four corners of the base and extending vertically upwards therefrom, and two cross members extending horizontally from one portion of the base to an opposite portion of the base.

6. The method of claim 1, wherein the bundling step comprises:

wrapping lengths of the banding material tightly around the collection of tip subsections located in the compacting and bundling apparatus; and securing the ends of the banding material to form a bundle of tip subsections.

7. The method of claim 1, wherein the step of laterally cutting is performed by making a series of cuts through the tip section that are each substantially perpendicular to a longitudinal axis of the blade and spaced apart along the length of the blade.

8. The method of claim 7, where each of the cutting steps is performed by a saw.

9. The method of claim 7, further comprising the step of applying a force on a top side of at least one tip subsection to flatten the tip subsection.

10. The method of claim 1, wherein the transportation vehicle is a flatbed truck.

11. The method of claim 10, wherein the loading step comprises placing multiple bundles on a flatbed trailer of the flatbed truck.

12. The method of claim 11, further comprising:

transporting the bundles to a recycling facility to be recycled.

\* \* \* \* \*